(12) United States Patent
Hartley et al.

(10) Patent No.: US 8,688,502 B2
(45) Date of Patent: Apr. 1, 2014

(54) BUSINESS INTELLIGENCE DASHBOARDS FOR PERFORMANCE ANALYSIS

(75) Inventors: Jo Ann Hartley, Burlingame, CA (US); Bao Tuan Haba, Newark, CA (US); Houman Behzadi, Menlo Park, CA (US); Mohit Mahendra, Foster City, CA (US); Ognjen Pavlovic, Atherton, CA (US); Philippe Lions, Venelles (FR)

(73) Assignee: Oracle International Corporation, Redwood Shores, CA (US)

( * ) Notice: Subject to any disclaimer, the term of this patent is extended or adjusted under 35 U.S.C. 154(b) by 183 days.

(21) Appl. No.: 12/711,648

(22) Filed: Feb. 24, 2010

(65) Prior Publication Data

US 2011/0208562 A1   Aug. 25, 2011

(51) Int. Cl.
*G06Q 10/00* (2012.01)

(52) U.S. Cl.
USPC ........................................... 705/7.29

(58) Field of Classification Search
USPC ........................................... 705/7.29
See application file for complete search history.

(56) References Cited

U.S. PATENT DOCUMENTS

| | | | | |
|---|---|---|---|---|
| 7,620,564 B1 * | 11/2009 | Lippock | ................. | 705/7.29 |
| 7,627,666 B1 | 12/2009 | DeGiulio et al. | | |
| 7,693,748 B1 * | 4/2010 | Mesaros | ................. | 705/26.42 |
| 7,822,712 B1 | 10/2010 | Robinson et al. | | |
| 7,937,286 B2 | 5/2011 | Newman et al. | | |
| 7,974,870 B2 | 7/2011 | Ikezawa | | |
| 2002/0133368 A1 * | 9/2002 | Strutt et al. | ................. | 705/1 |
| 2005/0102374 A1 | 5/2005 | Moragne et al. | | |
| 2005/0231392 A1 | 10/2005 | Meehan et al. | | |
| 2005/0256778 A1 * | 11/2005 | Boyd et al. | ................. | 705/26 |
| 2008/0228820 A1 | 9/2008 | Kenedy et al. | | |
| 2008/0233927 A1 | 9/2008 | Moon et al. | | |
| 2009/0018996 A1 | 1/2009 | Hunt et al. | | |
| 2011/0016376 A1 | 1/2011 | Hinson | | |
| 2011/0066999 A1 | 3/2011 | Rabinovich et al. | | |

FOREIGN PATENT DOCUMENTS

JP     2003030406     1/2003

OTHER PUBLICATIONS

U.S. Appl. No. 12/711,623, Non-Final Office action, mailed Jan. 14, 2013, 20 pages.
U.S. Appl. No. 12/711,623, Final Office action, mailed Jun. 3, 2013, 27 pages.

\* cited by examiner

*Primary Examiner* — Johnna Loftis
(74) *Attorney, Agent, or Firm* — Kilpatrick Townsend & Stockton LLP

(57) ABSTRACT

Novel tools and techniques for providing decision support to enterprises. Certain of these tools analyze and/or display information, including, in a particular aspect, revenue and/or other financial information, in novel ways. These features can provide users with enhanced insight into the performance of various product lines and/or into opportunities to enhance such performance, including (but not limited to) insight into the performance of two or more product lines in conjunction with one another. In another aspect, certain tools provide heretofore unavailable facilities for evaluating the success of an acquisition, for example, by providing insight into the market compatibility of an acquired product line with an existing product line.

19 Claims, 11 Drawing Sheets

| Top Affinities | FYQ1-FY2009 | FYQ2-FY2009 | FYQ3-FY2008 | FYQ3-Fy2009 | FYQ4-FY2008 | Total |
|---|---|---|---|---|---|---|
| Rk. 1 -Product A | 209 | 200 | 62 | 243 | 382 | 821 |
| Rk. 2- Product B | 480 | 512 | 112 | 550 | 810 | 1962 |
| Rk .3 - Product C | 666 | 751 | 175 | 771 | 1009 | 2571 |
| Rk. 4 - Product D | 287 | 314 | 69 | 305 | 543 | 1240 |
| All Others | 1592 | 1910 | 518 | 2102 | 2762 | 6581 |
| Total | 2481 | 2902 | 709 | 3091 | 4012 | 9361 |

705

| Top Affinities | FYQ1-FY2009 | FYQ2-FY2009 | FYQ3-FY2008 | FYQ3-Fy2009 | FYQ4-FY2008 | Total |
|---|---|---|---|---|---|---|
| Rk. 1 -Product A | 26,429,781 | 46,664,184 | 17,569,391 | 100,000,589 | 208,669,381 | 399,333,325 |
| Rk. 2- Product B | 36,977,037 | 58,133,376 | 16,914,312 | 66,033,850 | 157,865,912 | 335,924,486 |
| Rk .3 - Product C | 59,490,613 | 61,069,472 | 15,481,933 | 60,347,485 | 123,789,508 | 320,179,011 |
| Rk. 4 - Product D | 20,014,738 | 30,993,476 | 2,604,363 | 18,756,526 | 82,092,450 | 154,461,553 |
| All Others | 246,462,608 | 373,859,980 | 81,262,197 | 244,512,853 | 645,612,824 | 1,591,710,461 |
| Total | 389,374,776 | 570,720,488 | 133,832,197 | 489,651,302 | 1,218,030,074 | 2,801,608,836 |

BUSINESS INTELLIGENCE DASHBOARDS FOR PERFORMANCE ANALYSIS

CROSS-REFERENCES TO RELATED APPLICATIONS

This application is related to co-pending U.S. patent application Ser. No. 12/711,623, filed Feb. 24, 2010 by Hartley et al. and entitled "Mapping Data in Enterprise Applications for Operational Visibility", which is hereby incorporated by reference, as if set forth in full in this document, for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to business intelligence systems, and more particularly, to tools and techniques for displaying revenue data.

BACKGROUND

Commercial enterprises typically seek to improve financial performance as time goes on. One way to gain insight into possible performance improvements is by analyzing past performance. Business intelligence systems can facilitate this process by synthesizing mountains of data (such as revenue data, cost data, and the like) to allow enterprises to see patterns and gain insights that are not readily apparent from the raw data (often because of the sheer volume of the data to be analyzed).

In particular, data on revenue from sales of products (which can include any of a variety of difference goods and/or services) can be used to drive decisions on which products should be emphasized in marketing campaigns, which products should be developed further, and/or which products should be dropped from an enterprise's product line altogether, to name a few examples. More specifically, past revenue data can provide insight into products that might have a symbiotic relationship (such that they should be marketed together and/or to the same potential customers), as well as insight into geographical trends (which can inform decisions about deployment of sales force resources, marketing resources, and/or the like).

Similarly, an enterprise often will engage in a merger or acquisition of another enterprise with a goal of integrating the product lines of the two enterprises; it is often hoped that this integration will result in a symbiotic relationship between the respective product lines. Merely by way of example, a corporation selling a primary product might acquire another corporation selling a complementary product with the goal of expanding the market of the complementary product and/or with the hope that sales of the complementary product will drive further sales of the primary product. To evaluate the efficacy of such an acquisition retrospectively (and, correspondingly, to learn from that experience in order to inform future acquisition strategies), it would be helpful to be able to analyze the revenue performance of the primary and/or complementary product. Ideally, such analysis could be normalized (to account for other product lines which might also affect revenue performance, etc.).

There are, however, obstacles to the use of revenue data in this fashion. The first obstacle is in identifying patterns in the data. In the past, identification of such patterns has been a difficult and labor-intensive process, requiring personnel with both the data processing expertise to manipulate the data and the business expertise to understand how the data should be manipulated and/or understood. Business intelligence systems have remedied this problem somewhat, but the use of such systems typically still requires significant data processing expertise, often placing them out of reach of the business people who can understand the meaning of identified trends and make business decisions thereupon.

Another obstacle to the employment of revenue data for decision support purposes is that, even if the data can be analyzed and trends identified, it is difficult to convey these trends in a meaningful manner. Research shows that most humans intuitively can grasp information more readily which it is provided in a graphical format than when the information is provided numerically or textually. In some cases, the graphical presentation of data is a trivial matter—for example, a chronological series of numbers can easily be displayed as a line plot or a bar chart, with the horizontal axis representing a time scale. But when such data is multidimensional, it becomes more difficult to convey that data graphically in a meaningful way.

This problem is especially true when the display of the data is meant to provide geographical insight. For example, while applications such as Google Earth™ can be used to map relatively simple, one dimensional data onto a geographical display (such as a world map), this task becomes significantly more complex when the data has no explicit geographical dimension, or when attempting to map multiple data sets with disparate geographical dimensions.

Hence, there is a need for improved tools and techniques for analyzing data (in particular revenue data), and providing the results of that analysis in a meaningful way.

BRIEF SUMMARY

A set of embodiments provides tools and techniques for providing decision support to enterprises. Certain of these tools analyze and/or display information, including, in a particular aspect, revenue and/or other financial information, in novel ways. These features can provide users with enhanced insight into the performance of various product lines and/or into opportunities to enhance such performance, including (but not limited to) insight into the performance of two or more product lines in conjunction with one another. In another aspect, certain tools provide heretofore unavailable facilities for evaluating the success of an acquisition, for example, by providing insight into the market compatibility of an acquired product line with an existing product line.

Yet other embodiments provide tools and techniques for generating map displays to graphically illustrate financial performance. In one aspect, a map display might employ a coloration scheme that distinguishes among various ranked regions to illustrate, for example, revenue performance (which can be measured by any of a number of metrics), to allow a user to quickly understand the relative performance of a product line across a number of regions. In another aspect, a map display might correlate a first set of revenue information (or other financial information) with other data sets, such as sales force data, competitive sales data, and/or the like, to allow a user to quickly identify correlative patterns in the two data sets. Such map displays might feature two maps sideby-side, or might superimpose a map of one data set over a map of another data set, to assist in the user's visual analysis.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical and/or tangible computer readable media (such as, to name but a few examples, optical media, magnetic media, and/or the like).

Merely by way of example, a method in accordance with one set of embodiments comprises accessing revenue data, stored in a database, about a plurality of revenue transactions. In one aspect of certain embodiments, the revenue data might be created by an enterprise application, and/or the revenue data about each revenue transaction might identify an amount of revenue generated by a sale of one or more products by an enterprise. The method might further comprise providing a user interface for a user to interact with a data presentation system in communication with the database. In some cases, the method also comprises defining a geographical hierarchy for the revenue data, which might define a plurality of regions organized hierarchically, and/or categorizing the revenue data according to the geographical hierarchy.

In some embodiments, the method further comprises defining a ranking scheme for the revenue data; in an aspect, the ranking scheme might comprise a plurality of thresholds for segmenting the plurality of regions into a plurality of ranks, according to a revenue characteristic for each region. The method might further comprise defining a coloration scheme for the revenue data. The coloration scheme, in an aspect, defines a coloration pattern corresponding to each of the plurality of ranks. The method, then, may further include generating a map display in the user interface. In an aspect, the map display shows at least a subset of the plurality of regions defined by the geographical hierarchy for the revenue data, and each displayed region might a rank defined by the ranking scheme and a corresponding coloration pattern defined by the coloration scheme.

A method in accordance with another set of embodiments comprises accessing revenue data, stored in a database, about a plurality of revenue transactions, providing a user interface for a user to interact with a data presentation system in communication with the database, and receiving, via the user interface, selection of a product line for analysis. The method might further comprise identifying a set of revenue transactions corresponding to the selected product line, each of the revenue transactions in the set of revenue transactions having an associated customer, and/or identifying a set of customers associated with the set of revenue transactions.

In some embodiments, the method further comprises analyzing each of the customers in the set of customers to identify an amount of revenue attributable to each customer, receiving a selection of a revenue characteristic of interest, and/or segmenting the set of customers into a plurality of subsets of customers, according to the selected customer characteristic of interest. The method might further comprise displaying, in the user interface, revenue information about at least one of the subsets of customers.

Another set of embodiments provides computer systems. A computer system in accordance with one embodiment comprises one or more processors, along with a computer readable medium in communication with the one or more processors. The computer readable medium might have encoded thereon a set of instructions executable by the computer system to perform one or more operations. The set of instructions might include instructions to perform operations in accordance with the methods described above. Similarly, an apparatus might comprise a computer readable medium having encoded thereon a set of instructions executable by one or more computers to perform one or more operations, including without limitation operations in accordance with the methods above.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 6-8 are exemplary screen displays depicting a user interface for displaying revenue information for a user, in accordance with various embodiments.

DETAILED DESCRIPTION OF CERTAIN EMBODIMENTS

Figure 1:
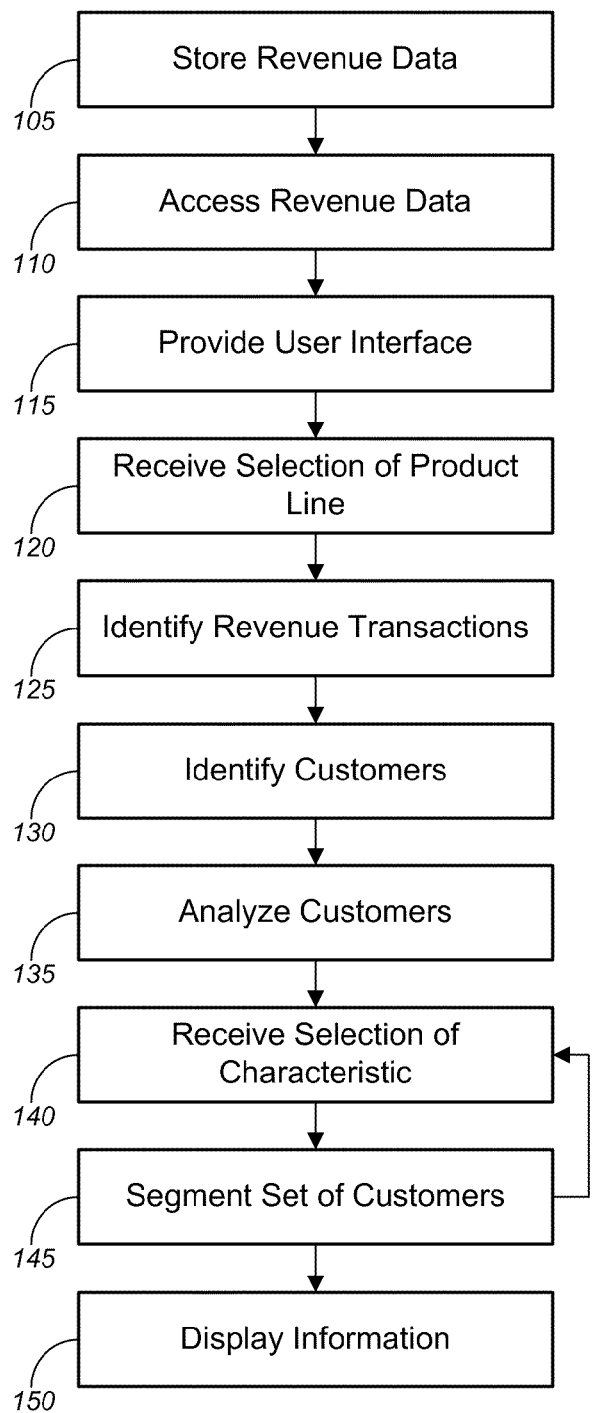
FIGS. 1-3 are process flow diagrams illustrating various methods of analyzing and/or displaying revenue information, in accordance with various embodiments.

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In an aspect, certain embodiments provide a decision maker (or other user) with analysis of revenue performance for various products (or product lines). A product can be any good or service that produces revenue for an operating entity (such as a corporation, etc.), such as through sales of a good, performance of a service, licensing of a software program or intellectual property, etc. In an aspect, a product line might comprise a group of (possibly related) products, and in another aspect, a product line might comprise a single product. Hence, unless the context clearly indicates otherwise, the terms "product" and "product line" should be interpreted broadly and interchangeably when used herein.

A set of embodiments provides tools and techniques for providing decision support to enterprises. Certain of these tools analyze and/or display information, including, in a particular aspect, revenue and/or other financial information, in novel ways. These features can provide users with enhanced insight into the performance of various product lines and/or into opportunities to enhance such performance, including (but not limited to) insight into the performance of two or more product lines in conjunction with one another. In another aspect, certain tools provide heretofore unavailable facilities for evaluating the success of an acquisition, for example, by providing insight into the market compatibility of an acquired product line with an existing product line.

Yet other embodiments provide tools and techniques that generate map displays to graphically illustrate financial performance. In an aspect, a map display might employ a coloration scheme that distinguishes among various ranked regions to illustrate, for example, revenue performance (which can be measured by any of a number of metrics), to allow a user to quickly understand the relative performance of a product line across a number of regions. In another aspect, a map display might correlate a first set of revenue information (or other financial information) with other data sets, such as sales force data, competitive sales data, and/or the like, to allow a user to quickly identify correlative patterns in the two data sets. Such map displays might feature two maps side-by-side, or might superimpose a map of one data set over a map of another data set, to assist in the user's visual analysis.

FIGS. 1-6 illustrate various methods that can be used to map financial information to geographic areas, analyze financial information, and/or display such mapped and/or analyzed financial information. While the methods of FIGS. 1-6 are illustrated, for ease of description, as different methods, it should be appreciated that the various techniques and procedures of these methods can be combined in any suitable fashion, and that, in some embodiments, the methods depicted by FIGS. 1-6 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, these methods (and/or portions thereof) may also be implemented using any suitable hardware implementation, including without limitation as software programs installed (and/or installable) on the computer systems described in detail below.

Figure 2:
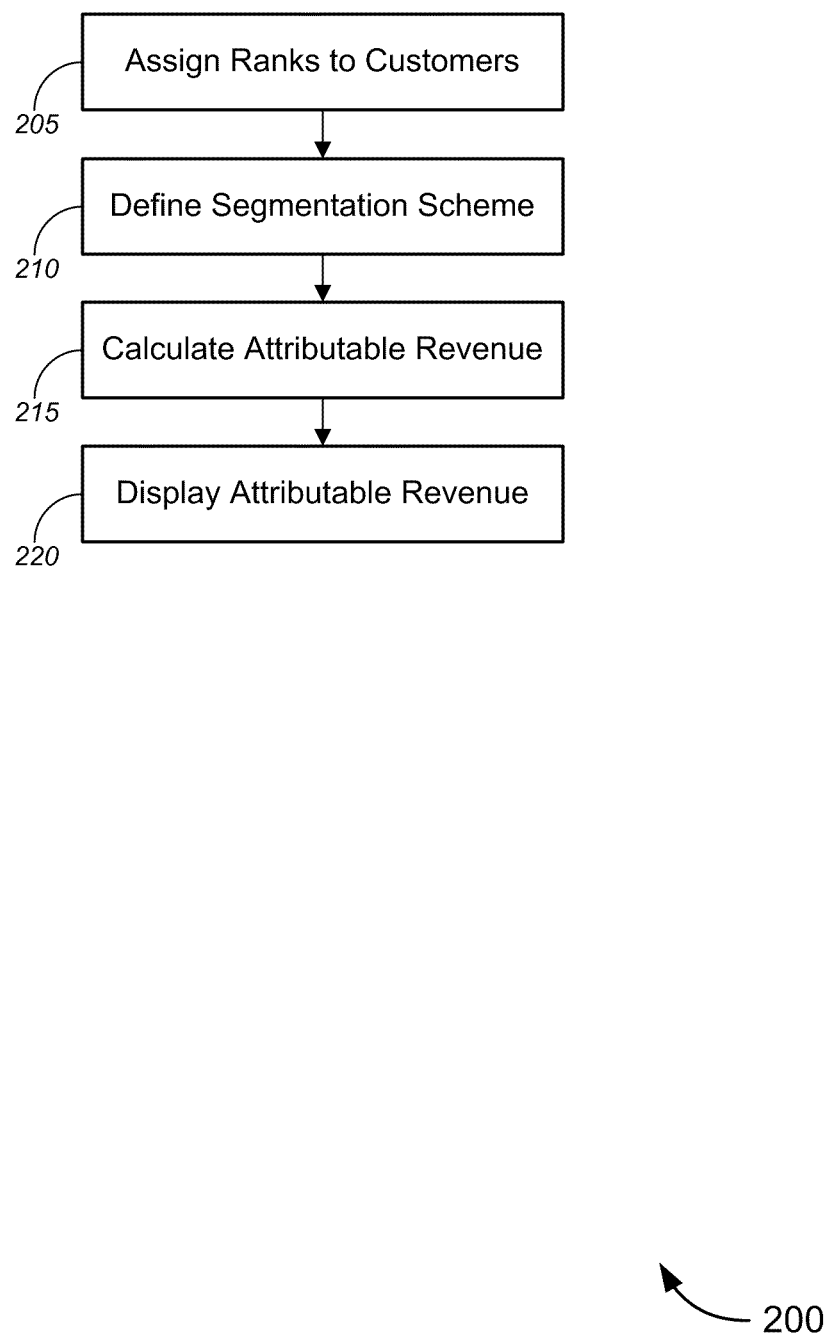
Figure 3:
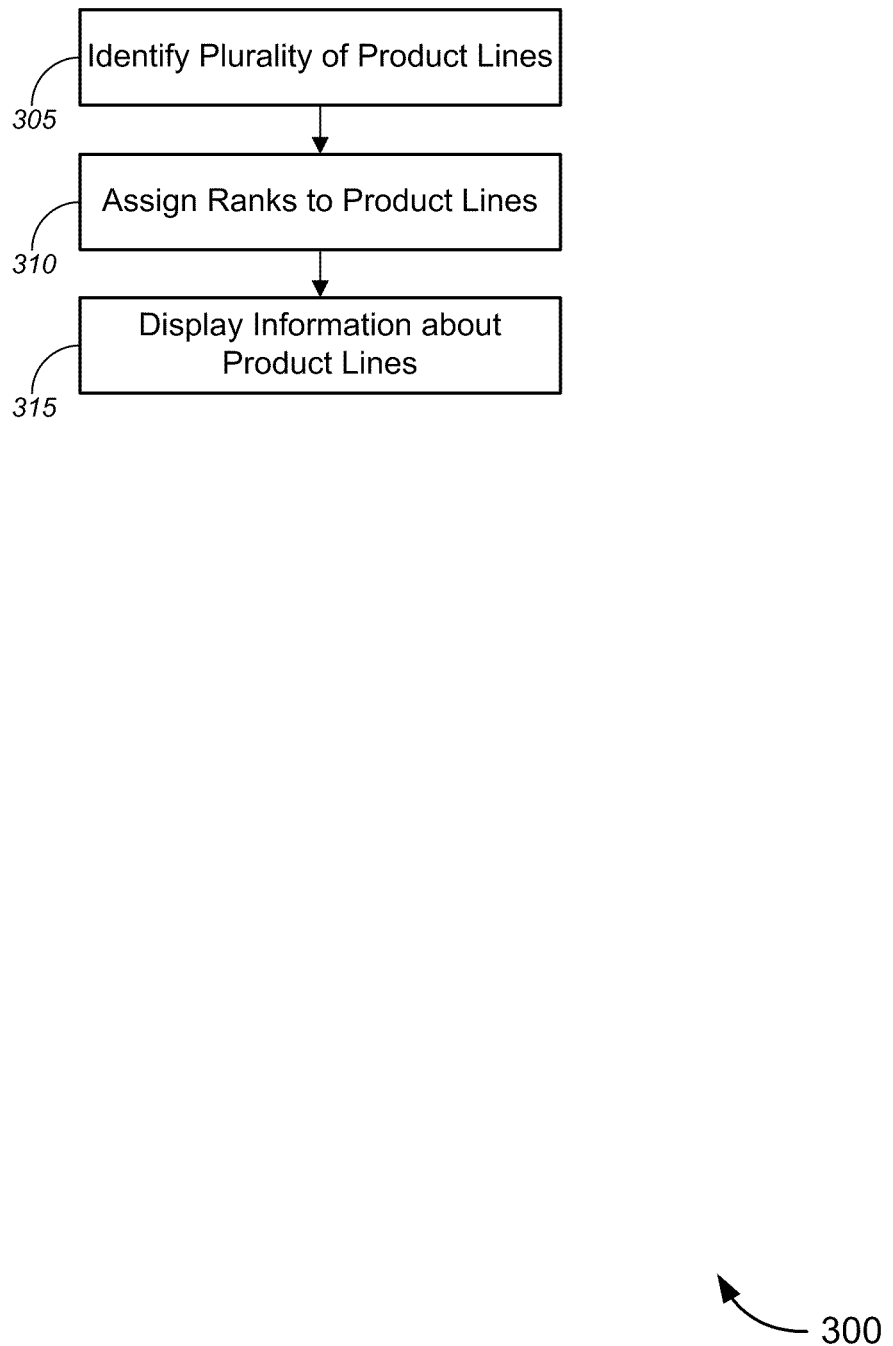

FIGS. 1-3 are process flow diagrams illustrating various methods of analyzing and/or displaying revenue information, in accordance with various embodiments. For example, FIG. 1 illustrates a method 100 of displaying information about revenue produced by an analysis of revenue from one or more product lines, in accordance with one set of embodiments.

In the illustrated embodiment, method 100 comprises storing (e.g., in a database) data about a plurality of transactions (block 105). In a particular aspect of some embodiments, this data might be revenue data that pertains to revenue transactions. A "revenue transaction" can be any transaction that produces revenue for an entity, such as a corporation.

Examples of revenue transactions can include sales transactions in which goods and/or services are transferred in return for some form of payment, license transactions (e.g., sales of software licenses, licenses to intellectual property, etc.), and/or the like. In one aspect, the revenue data may be created by an enterprise application, and/or the revenue data about each revenue transaction identifying an amount of revenue generated by a sale of one or more products (e.g., goods, services, licenses, etc.) by an enterprise. Revenue data about a particular transaction can include, without limitation, identification of a selling entity (and/or licensor), identification of a purchasing entity (and/or licensee), identification of a product and/or product line purchased (and/or licensed), identification of a quantity of the product purchased, a unit price, a gross sales amount, and/or a revenue amount (if different from the gross sales amount). In some cases, the database might include revenue transactions pertaining to sales of a product as well as revenue transactions related to services provided in connection with that product. In one aspect, these two data sets might both be treated as being associated with that product.

In many cases, data used by various embodiments (including without limitation revenue data) may be stored in a database and/or a data warehouse. Merely by way of example, in a typical embodiment, a business application (also referred to herein as an "enterprise application"), which may be responsible for tracking and/or accounting for many types of business transactions, including without limitation revenue transactions, may store data about one or more revenue transactions in a database. (Examples of enterprise applications can include, without limitation, one or more applications such as those available in Oracle e-Business Suite™, Oracle Fusion Applications™, PeopleSoft Enterprise™, JD Edwards EnterpriseOne™, and Siebel CRM Applications™, all of which are commercially available from Oracle Corp.) An automated process, such as an extract-transform-load ("ETL") process may load this data into a data warehouse. For purposes of this disclosure, a data warehouse can be considered to be to be a specialized database for storing and/or analyzing data about large numbers of transactions. Embodiments may be used with transaction data stored in either a database and/or a warehouse, as well as other data storage mechanisms. Hence, as used herein, the term "database" means any appropriate data structure for storing data used by various embodiments; such data structures can include, without limitation, relational databases, non-relational databases, file systems, data warehouses, and/or the like.

At block 110, the method 100 comprises accessing data (e.g., revenue data) stored in the database. Often, the procedures for accessing the data may vary according to the nature of the database in which the data is stored; merely by way of example, many relational database management systems and data warehouse management systems provide mechanisms, such as SQL calls, stored procedures, etc., to provide access to data stored in databases managed by those systems, and such mechanisms may be used as appropriate. While the revenue data may be stored merely as a series of transaction records each pertaining to a particular revenue transaction (each transaction having associated details, such as customer identity, revenue amount, product/product line sold, etc.), it should be appreciated that the revenue data can be categorized in many ways; for example, the revenue data might be categorized as multiple sets of revenue data, each associated with a particular customer; as another example, the revenue data might be categorized as multiple sets of revenue data, each pertaining to revenue generated by sales of a set of one or more products in a particular product line.

The method 100 further comprises, in some embodiments, providing a user interface (block 115). In an aspect, this user interface can provide the user with the ability to interact with a data presentation system. (This data presentation system, which may be in communication with the database and/or may be responsible for accessing the data in the database, may also perform many of the analysis and/or display functions described herein.)

For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, keyboards (both numeric and alphanumeric), microphones, etc. The procedures undertaken to provide a user interface, therefore, can vary depending on the nature of the implementation; in some cases, providing a user interface can comprise displaying the user interface on a display device; in other cases, however, where the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies.

In many cases, providing a user interface will comprise providing one or more display screens (a few examples of which are described below), each of which includes one or more user interface elements. As used herein, the term "user interface element" (also described as a "user interface mechanism" or a "user interface device") means any text, image or device that can be displayed on a display screen for providing information to a user and/or for receiving user input. Some such elements are commonly referred to as "widgets," and can include, without limitation, text, text boxes, text fields, tables and/or grids, charts, hyperlinks, buttons, lists, combo boxes, checkboxes, radio buttons, and/or the like. While the exemplary display screens described herein employ specific user interface elements appropriate for the type of information to be conveyed/received by computer system in accordance with the described embodiments, it should be appreciated that the choice of user interface element for a particular purpose is typically implementation-dependent and/or discretionary. Hence, the illustrated user interface elements employed by the display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output.

In the illustrated embodiment, the method 100 further comprises receiving a selection of one or more product lines for analysis (block 120). In many embodiments, the selection is received as user input via the user interface. Merely by way of example, in some embodiments, the user may be provided with a list of product lines (e.g., in a drop box or other appropriate interface element), may be provided with a text input field to specify a product line, and/or the like. As noted above, some cases, a product line might simply identify a single product, while in other cases, a product line might identify multiple products (e.g., a family of related products). In particular embodiments, a user might select multiple product lines to be analyzed against one another, as described in further detail below.

At block 125, the method 100 comprises identifying a set of revenue transactions corresponding to the selected product line. Merely by way of example, in a set of embodiments, identifying a set of revenue transactions might comprise searching the database in which the revenue data is stored, using an identifier of the selected product line as a search criteria. As noted above, in many cases, the database will comprise data (e.g., a series of records) about revenue transactions; each of these records might have a field for identifying a product and/or product line, such that the database can be searched for records in which the value of that field matches a search criterion provided by the user when selecting a product line for analysis. (In some embodiments, the procedures for identifying the set of revenue transactions and for accessing revenue data might be consolidated into the same set of operations.)

In certain embodiments, the method 100 further comprises identifying a set of customers associated with the identified set of revenue transactions (block 130). Merely by way of example, in some embodiments, the search results might be a set of records in the database that all have a product or product-line identifier that matches the product line specified by the user. Each of these records might also have a customer identifier field, and the records thus can be analyzed to identify the customer from the value in this field. From this analysis, a set of customers can be identified from the set of transactions pertaining to the product line of interest.

The method 100 might further comprise analyzing some or all of the customers in the identified set of customers (block 135). In an aspect, this analysis might include identifying an amount of revenue attributable to each customer (either on a per-transaction basis or as a collective amount), for example, by analyzing a revenue field in each record for each customer, and optionally consolidating the revenue values across multiple records (representing multiple revenue transactions) for a single customer.

At block 140, the method 100 comprises receiving a selection of one or more revenue characteristics of interest. As used herein, the term "revenue characteristic" means any characteristic of a revenue transaction that can be used to differentiate, sort, categorize, and/or distinguish between individual revenue transactions and/or between sets or groups of revenue transactions. These characteristics of interest, as described in further detail below, can be used to segment and/or analyze the data for the identified customers. In some aspects, the selection of characteristic(s) of interest is received from the user, via the user interface, in a manner similar to the way in which the product lines of interest are selected. In accordance with different embodiments, a wide variety of revenue characteristics may be available for the user to select, and/or the analysis and/or segmentation of the data may vary according to the selected revenue characteristic(s).

Some revenue characteristics may pertain primarily to products and/or product lines. Merely by way of example, one possible revenue characteristic is revenue earned on sales of a product line (e.g., over a specified period). Using this revenue characteristic, product lines may be sorted, ranked, differentiated, etc. according to the revenue generated from those product lines (as calculated from some or all of the identified revenue transactions that pertain to each product line). Other examples of such revenue characteristics are described in further detail below.

Another type of revenue characteristic that can be supported by various embodiments is a revenue characteristic that pertains primarily to customers. For example, customer size is a revenue characteristic that might be selected by a user that wanted to analyze the revenue data according to the size of the customers (e.g., companies, etc.) that participated in the identified revenue transactions. Using this characteristic, a user could view results of analysis of revenue by customer size (e.g., to determine how much of the revenue was generated from customers falling within various size categories determined by thresholds specified by the user, preconfigured by the system, etc.). Similarly, customer identity is a revenue characteristic that can be used to generate, for example, a list of customers ranked by revenue. Other revenue characteristics can include, without limitation, customer industry segment, whether the customer has purchased a competing product from another vendor, and customer region (which can be used with the mapping tools provided by other embodiments, as described below), to name a few examples.

In some cases, multiple revenue characteristics might be selected. For example, the user might select product line and customer identity characteristics, which could be used to generate a plurality of lists of customers ranked by revenue, with each list pertaining only to revenue generated by one (or more) of the product lines. From these examples, one skilled in the art should appreciate that various embodiments can provide users with a variety of dimensions by which revenue data can be analyzed, through the selection of different revenue characteristics for analysis.

In an aspect of certain embodiments, the method 100 might include segmenting the set of customers into two or more subsets (block 145). Merely by way of example, in some embodiments, the set of customers is segmented according to the characteristic of interest specified by the user. In an aspect, this segmenting may comprise classifying each customer into one of two or more groups, according to the characteristic of interest. So, for example, if the characteristic of interest is revenue earned over the course of a year, the customers might be divided into quartiles (or any other appropriate division, which might be specified by user input, by default business rules, and/or the like).

As illustrated by FIG. 1, the operations of receiving a selection of a characteristic of interest and segmenting the set of customers may be performed iteratively. For example, the set of customers may be segmented into two subgroups according to a first characteristic of interest, and one (or both of those subgroups) might be further segmented by a second characteristic of interest. Thus, for example, the set of customers might be segmented into quartiles according to an amount of revenue earned from sales of a particular product, and the top quartile (or all of the quartiles) might be further segmented into quintiles by customer size.

To further illustrate how a group of customers may be segmented in accordance with one embodiment, FIG. 2 illustrates a method 200 that may be employed to segment a group of customers according to a revenue characteristic of interest. At block 205, the method comprises assigning ranks to each of the customers in the set of customers. In an aspect, assigning a rank to a customer might comprise sorting the set of customers (e.g., from high to low, etc.) according to the value of the characteristic of interest for that customer. So, for example, if the characteristic of interest is revenue earned, the method might comprise finding each transaction (during the period of interest) that involved that customer and summing the revenue values of each of those transactions to obtain an overall revenue amount for that customer. After these procedures have been performed for every customer in the set, the set can then be sorted by the overall revenue amount for each customer, from high to low. After being sorted, the customers can then be ranked according to the sort order.

The method 200 may further comprise defining a segmentation scheme for the set of customers (block 210). In an aspect, the segmentation scheme might divide the set of customers in to a specified number of subsets of customers, according to the rank assigned to each customer. Merely by way of example, if segmentation into quartiles is desired, the segmentation scheme might divide the set of customers into four equally-sized subsets, with the first subset comprising the customers generating the largest revenue for the company (i.e., the "largest" customers), and so forth. In some cases, the segmentation scheme may be specified by application defaults, by business rules, and/or the like. In other cases, the user might be provided with the ability (using appropriate user interface elements) to specify a desired segmentation scheme.

In some cases, it is useful for decision makers to understand how overall revenue breaks down among the customers. For instance, if a majority of revenue is generated from a select few customers, it may be to the company's advantage to focus particularly on attracting additional revenue from those customers. Conversely, the company might wish to focus on "smaller customers" in an attempt to diversity its revenue base. In either case, it may be beneficial for a decision maker to see how the revenue from a particular product line (or overall revenue, if desired) is distributed among different classes of customers.

Accordingly, in an embodiment, the method 200 further comprises calculating an amount of revenue attributable to each subset of customers (block 215), as defined by the segmentation scheme. For instance, once the set of customers has been segmented into quartiles (or any other breakdown), the revenue from all of the customers in each quartile can be summed to produce a consolidated revenue amount for that quartile. The method 200, then, may further comprise displaying the amount of revenue attributable to each subset of customers (block 220), e.g., using the display techniques described in further detail below.

Returning to FIG. 1, the method 100 further comprises displaying, for a user, (block 150) information about revenue attributable to at least one of the subsets of customers. In an aspect, this information may be displayed in a user interface, and/or it might employ one or more graphical and/or textual user interface elements to display the information. The nature of the display will depend, on many cases, on the type of information being displayed, and a number of different types of information might be displayed, depending on the type of analysis requested by the user. In some cases, the displayed information might include revenue amounts attributable to one or more customers (or one or more subsets of customers, as described above).

In other cases, however, the revenue amounts might not be displayed. Merely by way of example, in a particular embodiment, a user might seek to understand affinity between two product lines, and the display might comprise a representation (either graphical, textual, or both) that provides a ranked list of one or more products with the highest affinity to the selected target product, without regard to the amount of revenue generated from each of the products. In other cases, however, the representation might also include revenue amounts—for instance, in the affinity example, the list of products might be ordered by revenue amount but might also be accompanied by an indication of the amount of revenue generated from sales of each product made in conjunction with sales of the selected target product.

Further, in some embodiments, whether or not actual revenue amounts are displayed, the user interface may provide users with the ability to drill into the displayed information to produce additional information. Different embodiments may support a wide variety of "drill-down" capabilities. Merely by way of example, as indicated below, certain embodiments provide the ability for a user to drill from a map display into various data (which typically will be, but need not necessarily be, related to information, such as products, sales force, regions, etc. corresponding to the map display itself). Likewise, certain embodiments can provide the ability for user to use any of the displays described herein to drill into further information (which may be, but need not necessarily be) relatively more focused, detailed, and/or specific. This drill-down feature may be implemented recursively, allowing a user to journey further into progressively more detailed and/or focused information, as the user drills from display screen to display screen. Correspondingly, however, various embodiments may provide the user with the ability to "drill up" into more summary information, and/or traverse between different types of data (e.g., progressively from general sales data, to data about a specific product, to data about a sales force responsible for that product, to general sales force data), by selecting appropriate user interface elements to drill into the desired information.

For instance, continuing with the affinity example, the user interface may provide a user interface element (which may be a portion of the displayed information itself, which may serve as a hyperlink, etc., and/or may be a corresponding element, such as a button, etc.) that allows the user to request the display of more detailed information about a particular product in the affinity list. In some cases, an additional user interface element might be provided to allow the user to provide input on what type of information the user would like to drill into.

To illustrate, if the display provides a graphical illustration of ten products with affinities to the selected target product, the user might be given the ability to select one of the products (e.g., by clicking on that product in the display) to drill into further information about that product. Such further information might include overall revenue information for that product (without regard to whether the revenue was generated in conjunction with a sale of the target product), historical revenue information, largest customers for that product, etc. A separate user interface element might allow the user to select which of these areas (or others), the user would like to drill into. In fact, certain embodiments may be considered recursive, in that selecting some portion of the displayed information might restart the method 100, with the selected information acting as the target for a new set of analysis.

Figure 6:
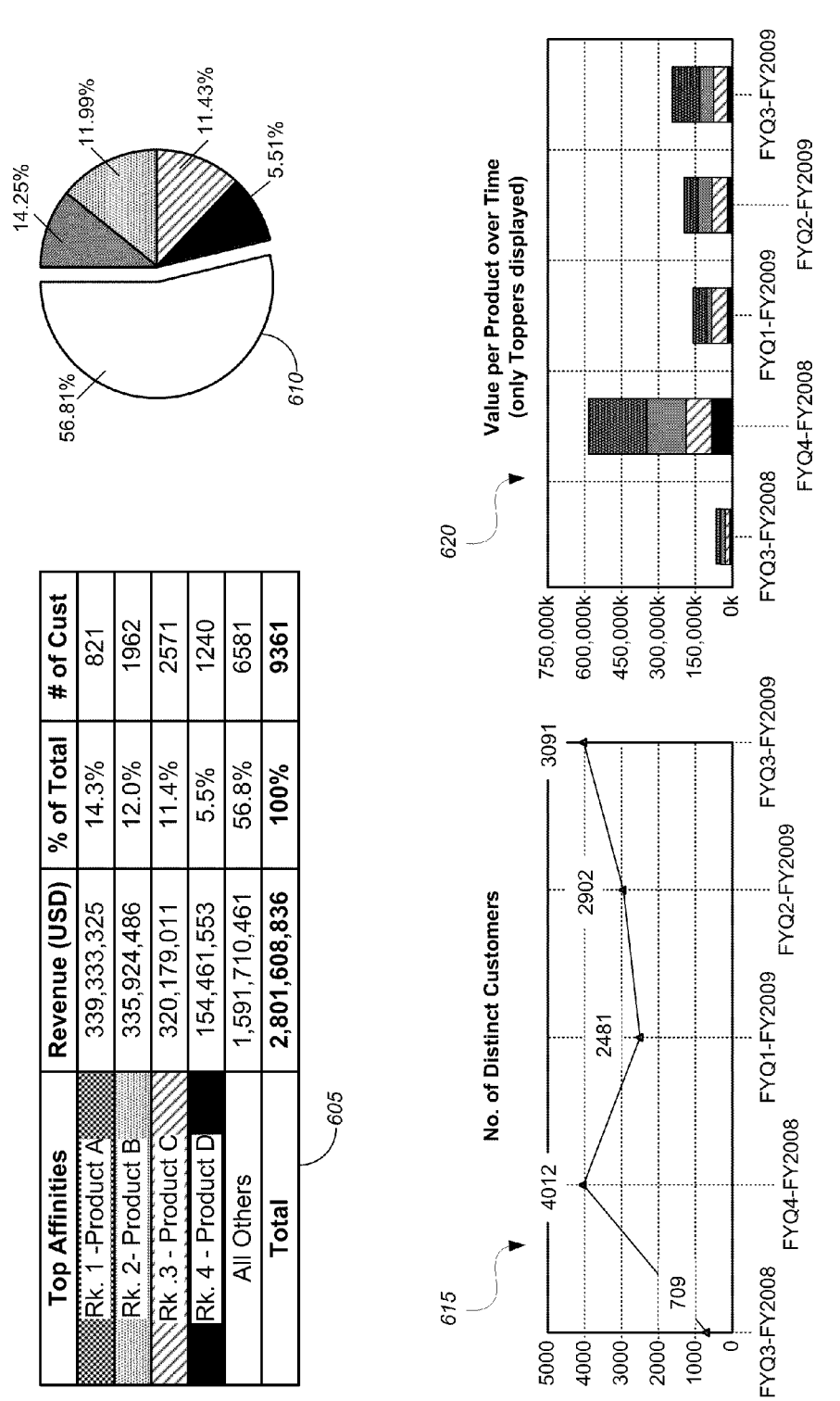

A user interface in accordance with one set of embodiments might be configured to display a dashboard display, one example of which is depicted by FIG. 6 and described in further detail below. In an exemplary embodiment the dashboard display might comprise a plurality of panels, each displaying information about revenue attributable to one or more subsets of customers; some of the panels might present information graphically (e.g., using charts, images, and/or other graphical devices), while others might present information textually (e.g., using lists, tables, and/or the like).

In accordance with various embodiments, many different types of information may be displayed by the user interface (e.g., using dashboard panels). Merely by way of example, in many embodiments, the user interface might display sorted lists of customers (e.g., customers that have been segmented into a particular subgroup). In other embodiments, the user interface might display revenue figures for one or more groups of customers. Such revenue figures can include, inter alia, revenue earned on one or more particular product line, revenue earned over one or more particular period, in one or more particular regions. In particular various embodiments can be used to provide deep analysis of revenue patterns based on customer characteristics, including without limitation revenue earned on sales to customers of a certain size, customers in certain industry segments, a competitor's customers, and/or the like. In particular, embodiments allow revenue to be broken out according to these characteristics to allow comparative analysis.

In some cases, the user may be given the option to view revenue data about multiple product lines (e.g., a comparative analysis of revenue across multiple product lines). Hence, FIG. 3 illustrates a method 300 of displaying revenue information about multiple product lines. In a particular embodiment, the method 300 may be integrated with the method 100 described above. Merely by way of example, in some cases, the revenue characteristic of interest might be an amount of revenue earned on the sales of one or more products other than one or more selected (target) product(s) or product line(s). The method 300, then, might comprise, at block 305, identifying a plurality of product lines, other than the selected product line(s), that each also have generated revenue attributable to a set of customers who also purchased the selected product line (e.g., customers identified as being associated with revenue transactions that correspond to the selected product line). The method 300 might further comprise assigning a rank to each of these identified product lines (block 310). In different embodiments, different criteria might be used to rank the identified product lines. By way of example, product lines might be ranked based on the amount of revenue generated by each respective product line and attributable to the identified set of customers, by a number of products sold (to the identified set of customers) in each product line, and/or by an amount of customers purchasing each product line. In this situation, displaying information about the attributable revenue might comprise displaying information about at least some of these identified product lines (block 315). This display might be based on the rank assigned to each of the identified product lines.

To illustrate, if the system identifies one hundred customers as purchasing the target product (i.e., as being associated with one or more revenue transactions corresponding to the target product), it might then identify twenty-five other products also purchased by one or more of those one hundred customers, and then rank those twenty-five products according to the collective amount of revenue each generated from the one hundred customers. The system might then display information about the top five ranked products (other than the target product); such information might include, merely by way of example, an identification of each displayed product, a collective amount of revenue generated from sales of each product to the customer set, and/or the like. As noted above, such a display might be textual and/or graphical in nature. In this way, the system can enable a decision maker to quickly find affinities between a target product and other products.

Figure 4:
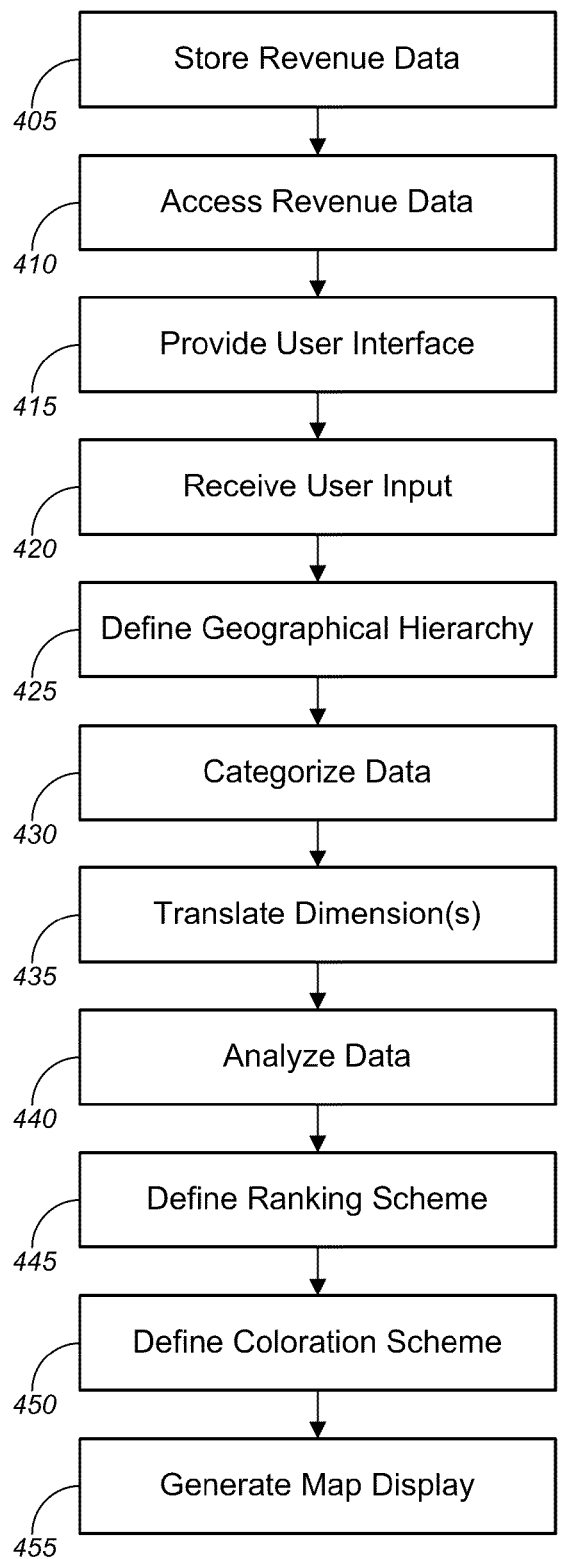
FIGS. 4 and 5 are process flow diagrams illustrating various methods of mapping revenue data, in accordance with various embodiments.
Figure 5:
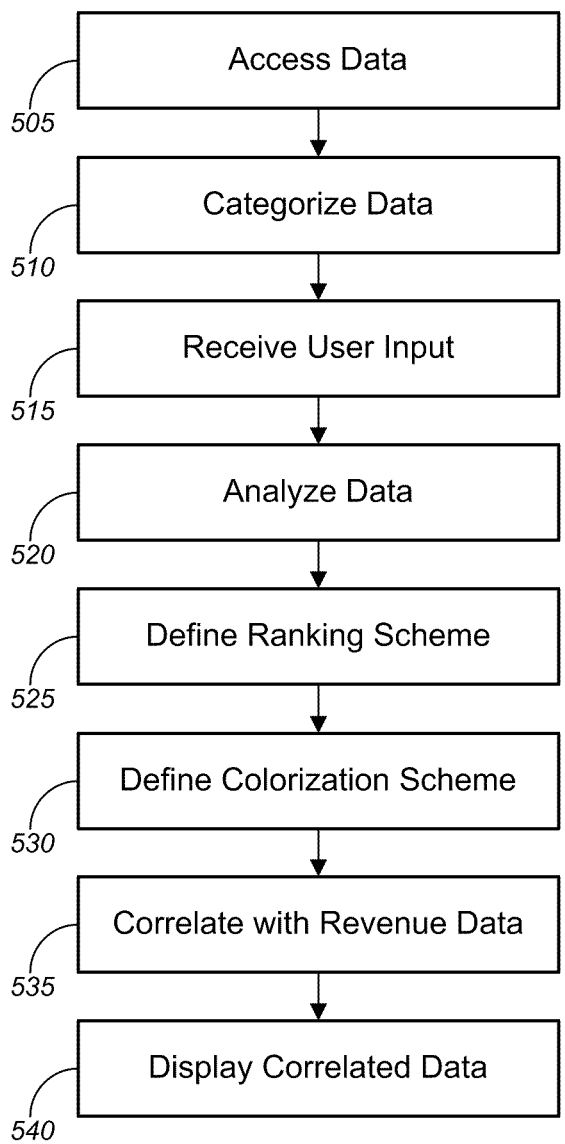

As noted above, certain embodiments can provide insight into geographical revenue trends, e.g., by mapping and displaying revenue data. FIGS. 4 and 5 are process flow diagrams illustrating various methods 400 and 500, respectively, of mapping revenue data, in accordance with various embodiments. In many cases, the mapping of data (including in particular revenue data) is useful to show relative performance of various regions (e.g., sales territories countries, states, etc.) in generating revenue. Accordingly, in an aspect, the first method 400 can be employed to generate a map with a ranked display of the relative performance of various regions, while the second method 500 can be used to correlate two data sets and/or to map the correlated data sets.

In an aspect, the methods 400 and/or 500 can operate on similar data to that used by the methods 100, 200, and 300 of FIGS. 1-3 and, in fact, can often be combined with those methods (e.g., to display a map of revenue data as one panel on a dashboard). Accordingly, the method 400 comprises several operations that are similar to those of the method 100, including without limitation storing revenue data (e.g., data about a plurality of revenue transactions) in a database (block 405), accessing the revenue data (block 410) and providing a user interface for user to interact with a data presentation system in communication with the database (block 415). In some embodiments, the revenue data might pertain to a specified of revenue transactions (including, for example, a set of revenue transactions that correspond to a particular product line, customer, customer set, etc.). Merely by way of example, the methods 100-300, and/or various portions thereof, might be used to identify the set of revenue transactions about which revenue data should be retrieved from the database and/or analyzed. For instance, in a particular embodiment, a user might select a product line in the manner described above, and the revenue data associated with transactions corresponding to that product line might be used in the method 400 of FIG. 4.

The method 400 further comprises receiving user input via the user interface (block 420). A variety of different types of user inputs might be used to specify how mapped data should be displayed, as described in further detail below. Merely by way of example, a user may provide input to specify a particular set of revenue data to be analyzed and/or mapped (e.g., to identify a product for analysis, to identify a time period for analysis, etc.), to specify a type of analysis to perform, to indicate a desired geographical hierarchy (and/or a level of a given geographical hierarchy to display on a map), to specify one or more thresholds to define a ranking scheme, to indicate one or more desired colors to be used on a map display, and/or to select a region of a map display, to name a few examples. Depending on the type of input that the user is to provide, various embodiments may provide a variety of different user interface elements to receive such input. Merely by way of example, a color palette may be provided to allow a user to select colors, while a list of threshold values and/or a text input box might be provided to allow a user to specify threshold values. In some embodiments, user input to select a mapped region may be received as a mouse click on the selected region in a map of a larger area (e.g., a mouse click on a continent in a world map). Based on these examples, one of skill in the art should appreciate that a wide variety of user interface elements may be used by various embodiments, and that these examples should not be considered limiting.

At block 425, the method 400 comprises defining a geographical hierarchy by which the revenue data should be categorized. In an aspect, a geographical hierarchy defines a plurality of regions that may be organized hierarchically. Merely by way of example, a geographical hierarchy might comprise a first hierarchical level that includes the entire world. That geographical hierarchy might include a second hierarchical level that comprises several regions (e.g., North America; Latin American and the Caribbean; Europe, the Middle East, and Africa ("EMEA"); and Asia Pacific. A third hierarchical level might include individual countries, and a fourth hierarchical level might includes intra-national regions or subdivisions where appropriate (e.g., states in the US, cantons in Switzerland, provinces in Canada, etc.). In another example, a geographical hierarchy might include a first level comprising the United States, a second level including regions within the United States (e.g., Pacific, Rocky Mountain, North, South, and East), a third region including individual states, and a fourth level including individual counties (or, in some cases, metropolitan areas, etc.). In an aspect, the regions defined at one level of the geographical hierarchy can be considered sub-regions of a region at a higher level of the hierarchy. For example, a geographical might define the United States as a region at a top level of the hierarchy and define each individual state as a region at a second level of the hierarchy; in this example, the states can be considered to be sub-regions of the United States.

In some cases, a geographical hierarchy might be defined based, at least in part, on user input. For example, a user might select a desired geographical hierarchy in the user interface. In other cases, a geographical hierarchy might be defined without user input at all, based, for instance, on a set of stored business rules that specify how a geographical hierarchy should be defined, and/or based on a geographical hierarchy specified by the financial data itself (e.g., in cases in which each transaction record has a geographical dimension, such as a sale location, customer location, etc.).

At block 430, the method 400 comprises categorizing the data according to the geographical hierarchy. In many cases, each data element (e.g., transaction record, etc.) in the set of financial data might have either a geographical dimension or another dimension from which a geographical dimension can be derived. For example, some companies might track their revenue data according to, inter alia, sales region. This dimension can be considered a geographical dimension and can be used to categorize the data according to the geographical hierarchy.

In some cases, the geographical dimension of the data elements might correspond to a different (second) geographical hierarchy than the hierarchy defined for categorizing the data (the first geographical hierarchy, in this example). Merely by way of example, the defined geographical hierarchy might be the first hierarchy described above (with the world at the first level, various intercontinental regions at the second level, and individual countries at the third level), while the financial data might include a geographical dimension that is non-hierarchical (i.e., organized by a geographical hierarchy that has only one level, such as the country of sale). As another example, some of the data might be organized by the first geographical hierarchy, while other data is organized according to a second hierarchy. This situation is common, for example, in the case of an acquisition, in which the sales territories of the acquisition do not align precisely with the sales territories of the acquirer. In the past, such situations made an integrated analysis of the inconsistent data difficult, if not impossible.

In such cases, the method 400 (and/or more precisely, the categorization of the data according to the geographical hierarchy) might include translating the geographical dimension of each financial data element from the second geographical hierarchy to the first geographical hierarchy (block 435). This can allow for the analysis and/or mapping of data from disparate sources and/or of legacy data that was collected using a different geographical hierarchy than the hierarchy that should be used to map the data. In one aspect, this translation can be facilitated by the use of a translation table, which maps locations in one hierarchy to locations in another hierarchy. A number of translation tables may be employed in accordance with different embodiments, and these translation tables may be created programmatically and/or manually. In a set of embodiments, translation tables, once created, can be reused as needed. In some cases, the transaction records may be updated with new hierarchy-specific location information, such that the translation need only be performed once for a given data element. In other cases, the translation may be performed at run time, recognizing that different geographical hierarchies may be used for different types of analyses. In still other embodiments, a hybrid procedure may be used, in which data elements are normalized to a standard hierarchy, and then that standard hierarchy can be translated to a use-specific hierarchy as needed.

It should be noted that this translation procedure may be used iteratively. if necessary. For example, a given dataset might include a first set of data elements with a geographical dimension that corresponds to a first geographical hierarchy and a second set of data elements with a geographical dimension that corresponds to a second geographical hierarchy. However, the desired analysis might require the use of a third geographical hierarchy. In this case, the first set of data elements might be translated with a first translation table, and the second set of data elements might be translated with a second translation table.

In other cases, the data might not have a geographical dimension per se, but it might include another, non-geographical dimension from which a geographical dimension can be derived. Merely by way of example, a sales record might not have any explicit geographical information, but it might include a sales department code for the department to which the sale was attributed. In this case, a translation table might translate department codes into a geographical dimension (e.g., by translating each sales department code into a location value corresponding to the sales territory for that respective sales department). In either case, the method 400 can include categorizing each data element (e.g., transaction record) into its appropriate location in the geographical hierarchy, according to whatever geographical information is available in the data and/or whatever geographical information can be derived from the data.

Figure 9:
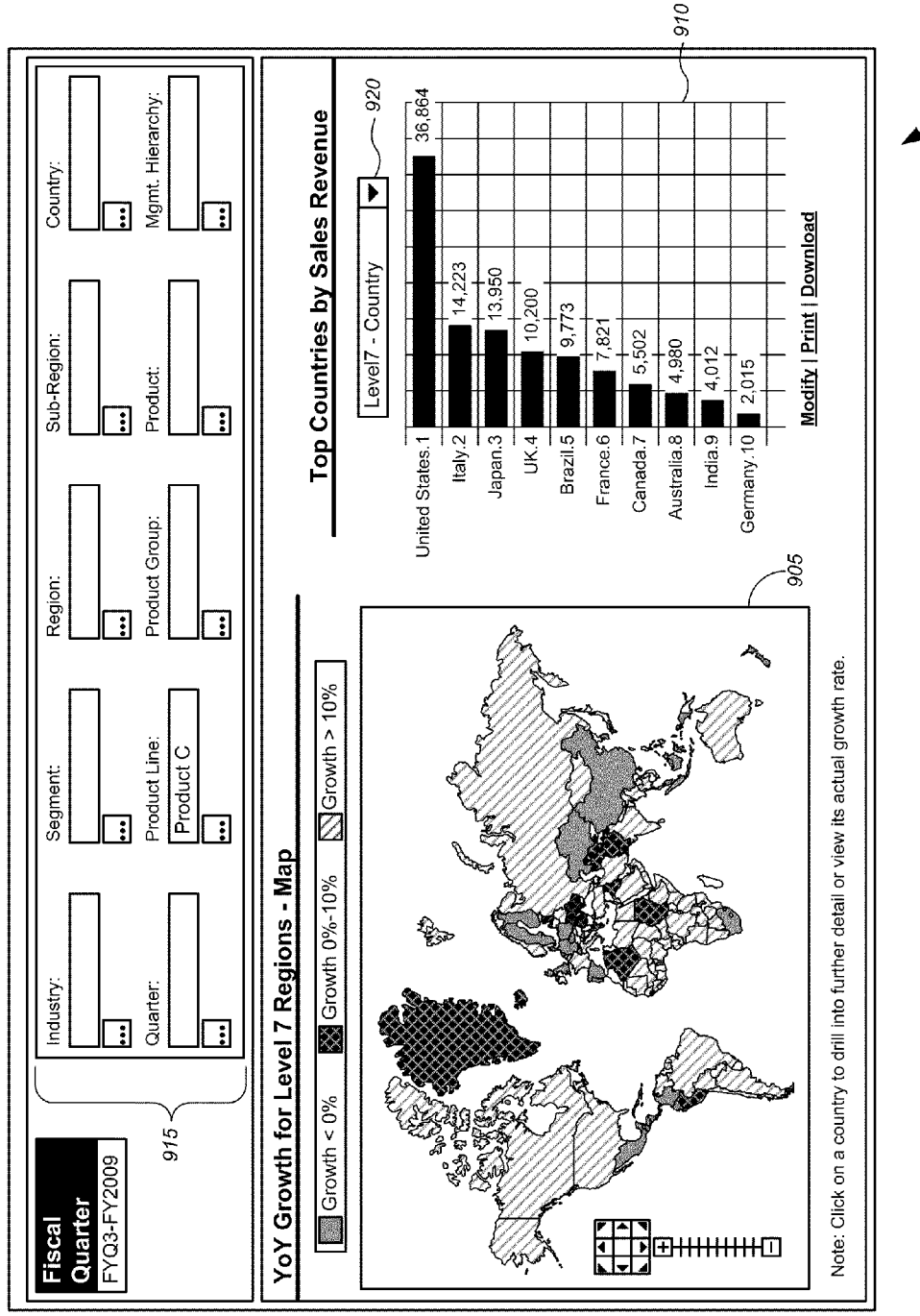
FIG. 9 is an exemplary screen display depicting a user interface for displaying mapped revenue data for a user, in accordance with various embodiments.

At block 440, the system analyzes the data. In one aspect, analyzing the data might comprise calculating a collective value of the categorized data for each region to be mapped, according to the defined geographical hierarchy. The nature of this calculation typically will depend on the type of metric the user would like to have mapped (which also determines which revenue data is selected at block 410, above). Merely by way of example, if the user would like to see a map of year-over-year revenue growth for each country (as illustrated in FIG. 9, for instance), the analysis typically would involve, for each country to be displayed, calculating the prior year's revenue (e.g., by summing the revenue values in all of the transaction records corresponding to that country for the prior fiscal year), calculating the current year's revenue (in similar fashion), and subtracting the first value from the second. Different calculations could be used to analyze different metrics (e.g., overall revenue earned over a given period, number of sales over a given period, average revenue per sale, etc.).

In some embodiments, the data are analyzed at the level of the geographical hierarchy that is to be displayed (which might be specified by the user, set by default, etc.). In other cases, however, the data are analyzed at the lowest level possible, and then the results of the analysis are "rolled up" the geographical hierarchy to the level at which the map will be displayed. This technique can be useful, for example, when a user desires to "drill into" the map to obtain detail at a lower level of the hierarchy (as described further below), as the lower-level analysis will have been performed already. (Of course, there are alternatives that would still allow a user to "drill into" a specified region without using roll-up analysis; merely by way of example, the data could be re-analyzed at the newly-selected level of the hierarchy if necessary.)

As noted above, the mapping techniques disclosed herein are particularly useful to analyze the respective performance of (or in) various geographical regions. Accordingly, in one set of embodiments, the method 400 comprises defining a ranking scheme for the data to be mapped (block 445). In an aspect, the ranking scheme comprises one or more thresholds for segmenting the regions in the geographical hierarchy into a plurality of ranks, according to a revenue characteristic of each region. In another aspect, this revenue characteristic comprises the metric by which the data is analyzed, as described above. In some cases, the thresholds are absolute thresholds (e.g., specific revenue figures, specific amounts of growth, etc.), while in other cases, the thresholds are relative thresholds (e.g., percentile thresholds, quartile thresholds, etc.).

In certain embodiments, the thresholds are set based on user input (e.g., user input specifying that the regions should be divided into quartiles; user input specifying that a first threshold should correspond to a first revenue amount, that a second threshold should correspond to a second revenue amount, etc.; and/or the like). In other embodiments, the thresholds may be determined without user input (e.g., based on an analysis of the data and/or business rules). Merely by way of example, if overall revenue per region is to be mapped, and if the analysis of the data indicates that every region had earned revenue between $0 and $500 million during the relevant period, with the majority of regions earning between $10 million and $100 million, the system might determine that the appropriate thresholds should be <$10 million, $10 million-$25 million, $25 million-$50 million, $50 million-$100 million, $100 million-$200 million, and >$200 million.

At block 450, the method 400 comprises defining a coloration scheme for the data. In an aspect, the coloration scheme defines a coloration pattern for each rank defined by the ranking scheme. In accordance with various embodiments, a coloration pattern might comprise any color, a pattern, and/or any other display characteristic that visually distinguishes regions of one rank from regions of another rank. As with the thresholds, the coloration scheme (and/or the individual coloration patterns thereof) may be defined either based on user input and/or automatically (e.g., based on system defaults, etc.). Merely by way of example, a user might select two or more colors, patterns, etc. (e.g., from a color palette provided by the user interface) and assign each of those colors, etc. to one of the ranks defined by the ranking scheme. In a particular embodiment, a coloration scheme might employ the same base color, in different shades, to illustrate different ranks defined by the ranking scheme, for example with the highest rank being the darkest color and the lowest rank being white (or blank), with progressive gradations of shading indicating intermediate ranks.

The method 400 further comprises generating a map display in the user interface (block 455). In an aspect, the map display shows at least a subset of the regions defined by the geographical hierarchy (and, in many cases, it will display all of the regions at a particular level of the geographical hierarchy). Each of the displayed regions, of course, typically will have a rank defined by the ranking scheme and a corresponding coloration pattern defined by the coloration scheme. FIG. 9, described in detail below, illustrates a user interface with a map display generated in accordance with the method 400.

In some cases, the method 400 (and/or portions thereof) may be used iteratively. Merely by way of example, in one embodiment, the user interface might receive user input selecting a displayed region (e.g., a "click" on one of the regions, a selection of a region from a menu, etc.), which might cause the system to implement any portions of the method 400 necessary to redraw the map (i.e., generate a new map display in the user interface) with a different scope; in other words, if the user selects a particular region, the system might generate a second map to display each of the sub-regions (as defined by the geographical hierarchy) of the selected region. For instance, if a user selects the United States on a displayed map of the world, the system might generate a map display showing only the United States, with each of the states displayed according to a ranking scheme and/or coloration scheme. In some cases, the new map might be generated with the same ranking scheme and/or coloration scheme (in which case the operations for defining those schemes might be omitted), while in other cases it may be appropriate to redefine ranking and/or coloration schemes for the more specific map display (for example, when showing overall revenue, the ranking scheme for a world map might not provide an effective display for a map of the US only, in which each the revenue scale might be significantly lower).

Hence, certain embodiments provide a user with the ability to drill into a specific region to see data at a lower level of the geographical hierarchy. Other options may be available as well. Merely by way of example, in some cases, rather than displaying a lower-level map, the system might, upon receiving a selection of a region, display financial data (e.g., using the techniques discussed with respect to FIGS. 1-3) specific to that region. Hence, the use of map displays allows users to obtain financial performance information (and other information) quickly and easily, particularly with respect to a region (at any desired level of the geographical hierarchy) in which the user is interested.

For instance, a user could drill from a displayed region in a geographical map into financial performance for that region (either overall, for a specific product line, etc.), to drill in to sales force information for that region (e.g., identities and/or performance metrics of sales representative(s) for that region), to drill into pipeline/sales channel information for that region, and/or the like. Moreover, as noted above, certain embodiments provide the user with the ability (e.g., using appropriate user interface elements) to drill down into more specific/focused/detailed information (either along a geographical dimension, such as into a lower level in a geographical hierarchy, or along another dimension, such as division, product line, specific performance metrics, etc.), to drill up into more general information (again, along any appropriate dimension), or traverse across different dimensions of data (e.g., from revenue totals, to sales force information, to pipeline information).

In some cases, it is useful to be able to map correlated data. For example, it might be useful to view revenue performance for two different products in the same geographical hierarchy, or to view revenue performance correlated with sales force data (e.g., number of sales people assigned to a particular region, changes in that number, etc.). Accordingly, FIG. 5 illustrates a method 500 that can be used to map correlated data. In one aspect, the method 500 of FIG. 5 can be implemented with the method 400 of FIG. 4 to display a first set of data (e.g., revenue data) along with another, second set of data that is correlated the first set of data.

The method 500 comprises accessing the second set data in a database (block 505), which may be (but need not be) the same database as the database in which the first set of data is stored; categorizing the second set of data (block 510), e.g., according to the same geographical hierarchy used to categorize the first set of data, receiving user input (block 515); analyzing the second set of data (block 520); defining a ranking scheme for the second set of data (block 525); and defining a coloration scheme for the second set of data (block 530). In an aspect, these procedures are similar to those described above with respect to FIG. 4, although they are performed with respect to the second set of data, rather than the first set of data.

In some cases, the ranking and/or coloration schemes might be the same for both sets of data (e.g., in cases in which two maps are to be displayed side-by-side, in which case similar ranking and/or coloration schemes might facilitate visual correlation between patterns in both sets of data), while in other cases, the ranking scheme might be different (e.g., when a different metric is analyzed for each data set) and/or the coloration scheme might be different (e.g., when both sets of data are to be displayed on the same map display, as described below, for example).

At block 535, the method 500 comprises correlating some or all of the revenue data (in the first set of data) with data in the second set of data. In some cases, this correlation is performed with respect to the regions specified by the geographical hierarchy, such that data in the first data set that is categorized within a particular region is correlated with a subset of the second data set; this subset comprises data within the second data set that also has been categorized within the same particular region. This correlation beneficially can allow a decision maker to understand relationships between the financial performance of one product and the financial performance of another product, or relationships between the financial performance of a product and another metric (such as sales force metrics).

Essentially, correlating portions of two data sets comprises normalizing the two data sets (or portions thereof) to the same geographical hierarchy, and/or providing information to the user based on these normalized data sets. There are several techniques by which the two data sets (or portions thereof) can be correlated for a user. Merely by way of example, in a particular embodiment, the method 500 comprises displaying information about the correlated data (block 540). This correlated information may be displayed with a map display (and/or with multiple map displays). Merely by way of example, in one embodiment, the user interface might display two maps (e.g., side-by-side) one showing a map display (as per the method 400) based on the first data set (or a portion thereof), such as a map display of revenue information, and the other showing a map display based on the second data set. For instance, one map display might illustrate worldwide revenue for a first product (categorized into regions) while the other map display might illustrate worldwide revenue for a second product (categorized into the same regions) for a second product. In another example, one map display might illustrate a change in worldwide revenue across all products (categorized into regions) over a certain period, while the other map display might illustrate changes in sales force personnel or advertising spending (categorized into the same regions) over a prior period.

It should be appreciated that many variations and enhancements to this display are possible. Merely by way of example, in some cases, three (or more) data sets may be correlated and/or displayed for the user. As another option, in some cases, the coloration schemes (if not the ranking schemes) may be coordinated, in order to allow an easy visual comparison between multiple map displays. Merely by way of example, if one map display illustrates revenue with a five-color, low-to-high scheme, another map might employ the same scheme to display advertising spending.

In some cases, rather than displaying two different (e.g., side-by-side) maps, the user interface might superimpose one map display over the other. For instance, revenue might be displayed using a coloration scheme that employs different colors for different ranks, while advertising spending might be displayed using a coloration scheme that employs different patterns (e.g., stripes, crosshatches, etc.) for different ranks. Other variations are possible as well.

In other embodiments, correlating two data sets might not involve generating map displays from both data sets. For instance, one data set might be used to generate a map display, while information about the other data set might be displayed in another graphical format (such as a chart, etc.) and/or a textual format (such as a table, etc.). In an aspect, however, the data may still be correlated. Merely by way of example, the user interface might include a map display might display revenue information for a product line at a given level of a geographical hierarchy, and a table showing the number of sales people for that product line, broken out into the regions specified by that level of the geographical hierarchy.

Figure 8:
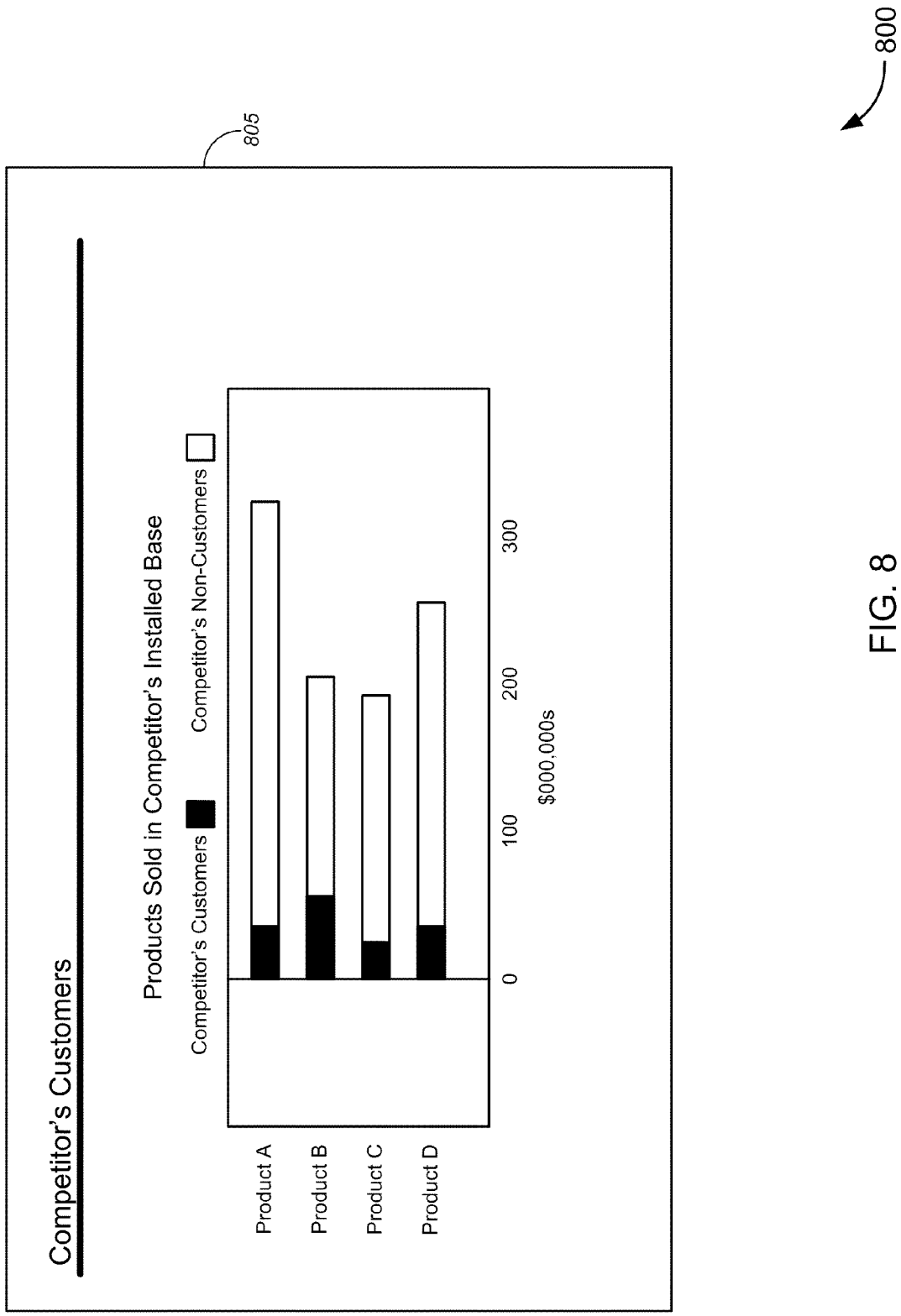

As should be clear from the description above, one aspect of many embodiments is the ability to display information (e.g., the results of analysis) for a user in effective ways. FIGS. 6-9 illustrate exemplary screen displays of user interfaces in accordance with various embodiments. FIGS. 6-8 are exemplary screen displays depicting a user interface for displaying revenue information for a user, in accordance with various embodiments, while FIG. 9 is an exemplary screen display depicting a user interface for displaying mapped revenue data for a user, in accordance with various embodiments.

FIG. 6 depicts a screen display 600 of a user interface displaying a dashboard with a plurality of panels. The first panel 605 provides a textual display of the affinities between a target product and several other product. This textual display, which takes the form of a table, shows the revenue for each of four products generated by customers that also bought the target product, as well as the number of customers in each subgroups. Notably, the panel 605 shows the subgroups in ranked order, with the top four subgroups (in terms of revenue generated) listed in order, and the remainder of the subgroups consolidated and shown after the top four subgroups. (In this case, for example, the revenue characteristic of interest might be an amount of revenue earned on sales of one or more products other than the target product, such that each subset of customers includes customers that purchased a product in addition to the target product. Note that, in this example, some customers might fall within two (or more) different subgroups, if they purchased two (or more) products in addition to the target product; the revenue earned from each respective product would be counted within the appropriate subgroup.)

The dashboard also includes a second panel 610 that displays the same information in graphical form, illustrating how certain embodiments can be used to display information in different formats to improve the effectiveness of the user interface in conveying the results of an analysis. In the illustrated embodiment, the coloration scheme employed in the pie chart panel 610 corresponds to that used in the table panel 605, allowing the user to visually correlate the data that is presented textually with the same data presented graphically. Additional panels might use similar coloration schemes to allow visual correlation of different types of information.

A third panel 615 displays the number of distinct customers of the target product (i.e., the number of customers associated with at least one revenue transaction pertaining to the target product), tracked on a rolling four quarters basis. This panel could be generated by the method 400 of FIG. 4, in which a revenue characteristic of interest being customer identity, such that each unique customer that purchased the target product during a given period effectively is segmented into its own subset. This process could be repeated for each the five trailing quarters, and the results plotted on a graph to provide a panel similar to the panel 615 of FIG. 6.

A fourth panel 620 displays a stacked bar chart showing the relative revenue generated from four different products over time. In some cases, this panel might be generated on an affinity basis (e.g., showing products with an affinity for the target product) and/or generated to show the top revenue generating products irrespective of any affinity relationships. In the former cases, the revenue characteristic of interest likely would be an amount of revenue earned on sales of one or more products other than the target product (similar to the panels 605 and 610 described above), with the additional feature that the analysis is conducted iteratively for the trailing five quarters, to provide a historical snapshot, while the table panel 605 and pie chart panel 610 might include rolled up data for the trailing year.

Certain embodiments provide the user with the ability to drill further into the data for more detail. Merely by way of example, the example screen display 700 of FIG. 7 illustrates two additional panels 705 and 710 that provide a textual display of detailed information corresponding to the summary information in the panel 605 described above. In the illustrated embodiment, the panel 705 shows a breakout of number of customers from the table in panel 605 the five trailing quarters (this data was rolled up to a trailing year figure in panel 605). Similarly, the panel 710 shows a breakout of the revenue figures from the table in panel 605. In an embodiment, a user can drill into this type of detailed information (as well as other types of detailed information) by providing user input, e.g., selection of a menu item requesting detailed information, clicking on the panel 605 (and/or a relevant cell, column, row, and/or column/row heading thereof, etc.).

As noted above, one possible revenue characteristic of interest is whether a customer has purchased a competitor's product (such that revenue data is segmented into two subgroups—one subgroup comprising customers that have purchased a competitor's product and one comprising customers that have not. This information can show whether the user's organization is making progress at selling into a competitor's installed base (or vice versa). Accordingly, FIG. 8 depicts an example screen display 800 with a panel 805 comprising a horizontal stacked bar chart showing, for each of four products, the relative proportion of revenue generated by customers that have purchased a particular competitor's product (this chart could also show absolute customer numbers, rather than revenue figures). Of course, such a chart presumes that information about customers' purchasing habits is available, but many organizations have access to such information, either as the result of customer surveys, etc., and/or competitive intelligence. This panel 805 can provide insight into the relative performance of different product lines in a competitor's installed base, providing a decision maker with information to enable strategic decisions about the deployment of marketing resources, advertising campaigns, sales efforts to specific types of customers, etc.

FIG. 9 shows an example screen display 900 of a user interface showing a map display 905, which can be generated using a method such as the method 400 of FIG. 4. The map display 905 illustrates a world map displaying the result of an analysis of year-over-year revenue growth, on a country-by-country basis, on sales of "Product C." The coloration scheme comprises three patterns (solid, striped and cross-hatched), corresponding to a ranking scheme that defines thresholds at 0% growth and 10% growth. The user interface in the example display 900 also comprises a table 910 displaying a ranked list of the top countries by sales revenue on sales of Product C, which might be generated by a method such as the method 100 of FIG. 1 (this example illustrates how the methods 400 and 100 can be used together). The user interface of the example screen display 900 also includes a plurality of user interface elements 915, which can be used to provide user input to indicate the parameters of the data from which the map display 905 should be generated. These user interface elements can be used, for example, to receive input specifying which revenue transactions should be included in the analysis that generates the map display. Another user interface element 920 can be used to receive input specifying a level of the geographical hierarchy at which the map display 905 should be generated. In an aspect, when input is received via any of these user interface elements 915, 920, any necessary portions of the method 400 may be reiterated with a new scope (as defined by the user input) to re-generate the map display 905. Similarly, if a user selects a particular region (e.g., country), for instance, by clicking in the map display 905, the map display 905 may be regenerated to display only the selected region, and/or other detailed information about the selected region might be displayed, as described above.

Figure 10:
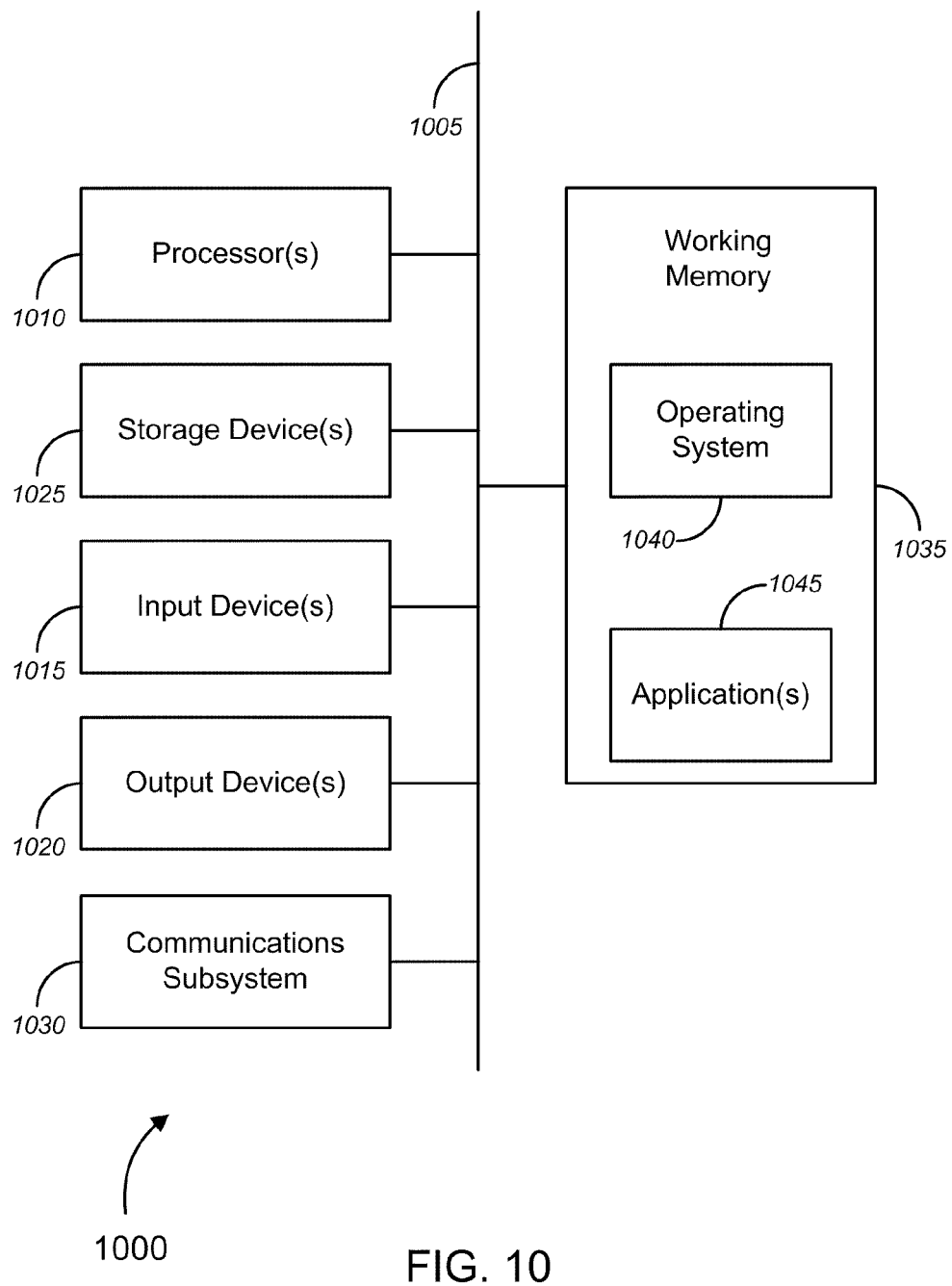
FIG. 10 is a generalized schematic diagram illustrating a computer system, in accordance with various embodiments.

FIG. 10 provides a schematic illustration of one embodiment of a computer system 1000 that can perform the methods provided by various other embodiments, as described herein. It should be noted that FIG. 10 is meant only to provide a generalized illustration of various components, of which one or more (or none) of each may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard and/or the like; and one or more output devices 1020, which can include without limitation a display device, a printer and/or the like.

The computer system 1000 may further include (and/or be in communication with) one or more storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1030 may permit data to be exchanged with a network (such as the network described below, to name one example), with other computer systems, and/or with any other devices described herein. In many embodiments, the computer system 1000 will further comprise a working memory 1035, which can include a RAM or ROM device, as described above.

The computer system 1000 also may comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a computer readable storage medium, such as the storage device(s) 1025 described above. In some cases, the storage medium might be incorporated within a computer system, such as the system 1000. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer readable medium, such as one or more of the storage device(s) 1025. Merely by way of example, execution of the sequences of instructions contained in the working memory 1035 might cause the processor(s) 1010 to perform one or more procedures of the methods described herein.

The terms "machine readable medium" and "computer readable medium," as used herein, refer to any medium that participates in providing data that causes a machine to operation in a specific fashion. In an embodiment implemented using the computer system 1000, various computer readable media might be involved in providing instructions/code to processor(s) 1010 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 1025. Volatile media includes, without limitation, dynamic memory, such as the working memory 1035. Transmission media includes, without limitation, coaxial cables, copper wire and fiber optics, including the wires that comprise the bus 1005, as well as the various components of the communication subsystem 1030 (and/or the media by which the communications subsystem 1030 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a storage device 1025 either before or after execution by the processor(s) 1010.

In an aspect, the computer system 1000 (or, more particularly, an operating system 1040 and/or one or more application programs 1045) comprises and/or provides a user interface to allow users to interact with the computer system 1000. A variety of user interfaces may be provided in accordance with various embodiments, including without limitation graphical user interfaces that display, for a user, display screens for providing information to the user and/or receiving user input from a user. (Several examples of such display screens are described above.)

Merely by way of example, in some embodiments, the computer system 1000 may be configured to communicate with a client computer (such as the user computers described below) via a dedicated application running on the client computer; in this situation, the user interface might be displayed by the client computer, based on data and/or instructions provided by the computer system 1000. In this situation, providing the user interface might comprise providing the instructions and/or data to cause the client computer to display the user interface. In other embodiments, the user interface may be provided from a web site that is incorporated within (and/or in communication with) the user computer, e.g., by providing a set of one or more web pages, which may be displayed in a web browser running on the user computer and/or served by a web server. In various embodiments, the computer system 1000 might comprise the web server and/or be in communication with the web server, such that the computer system 1000 provides data to the web server to be served as web pages for display by a browser at the user computer. In other embodiments, the computer system 1000 might be a user computer, which can display a user interface based on instructions and/or other data provided by a server computer (including without limitation displaying web pages served by a web server). In further cases, the computer system 1000 might be a standalone computer, on which operating system software and/or application software is installed to perform various methods provided by other embodiments and/or to provide a user interface in accordance with such methods.

Figure 11:
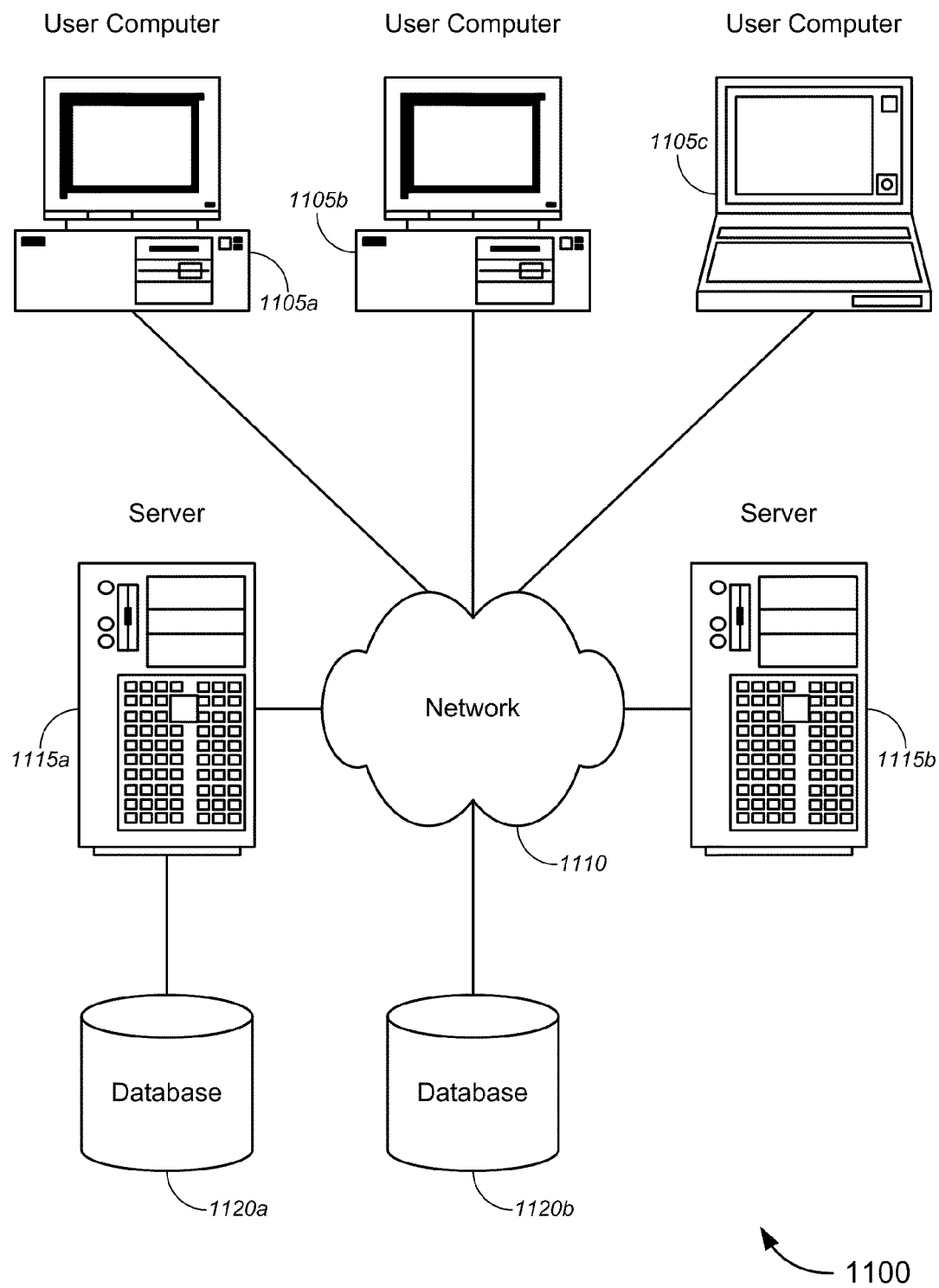
FIG. 11 is a block diagram illustrating a networked system of computers, which can be used in accordance with various embodiments.

A set of embodiments comprises systems for analyzing and/or displaying information, including in particular revenue information. Merely by way of example, FIG. 11 illustrates a schematic diagram of a system 1100 that can be used in accordance with one set of embodiments. The system 1100 can include one or more user computers 1105. A user computer 1105 can be a general purpose personal computers (including, merely by way of example, personal computers and/or laptop computers running any appropriate flavor of Microsoft Corp.'s Windows™ and/or Apple Corp.'s Macintosh™ operating systems) and/or a workstation computer running any of a variety of commercially-available UNIX™ or UNIX-like operating systems. A user computer 1105 can also have any of a variety of applications, including one or more applications configured to perform methods provided by various embodiments (as described above, for example), as well as one or more office applications, database client and/or server applications, and/or web browser applications. Alternatively, a user computer 1105 can be any other electronic device, such as a thin-client computer, Internet-enabled mobile telephone, and/or personal digital assistant, capable of communicating via a network (e.g., the network 1110 described below) and/or displaying and navigating web pages or other types of electronic documents. Although the exemplary system 1100 is shown with three user computers 1105, any number of user computers can be supported.

Certain embodiments operate in a networked environment, which can include a network 1110. The network 1110 can be any type of network familiar to those skilled in the art that can support data communications using any of a variety of commercially-available (and/or free or proprietary) protocols, including without limitation TCP/IP, SNA, IPX, AppleTalk, and the like. Merely by way of example, the network 1110 can include a local area network ("LAN"), including without limitation an Ethernet network, a Token-Ring network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 1115. Each of the server computers 1115 may be configured with an operating system, including without limitation any of those discussed above, as well as any commercially (or freely) available server operating systems. Each of the servers 1115 may also be running one or more applications, which can be configured to provide services to one or more clients 1105 and/or other servers 1115.

Merely by way of example, one of the servers 1115 may be a web server, which can be used, merely by way of example, to process requests for web pages or other electronic documents from user computers 1105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1105 to perform methods of the invention.

The server computers 1115, in some embodiments, might include one or more application servers, which can be configured with one or more applications accessible by a client running on one or more of the client computers 1105 and/or other servers 1115. Merely by way of example, the server(s) 1115 can be one or more general purpose computers capable of executing programs or scripts in response to the user computers 1105 and/or other servers 1115, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle, Microsoft, Sybase™, IBM™ and the like, which can process requests from clients (including, depending on the configuration, dedicated database clients, API clients, web browsers, etc.) running on a user computer 1105 and/or another server 1115. In some embodiments, an application server can create web pages dynamically for displaying the information in accordance with various embodiments, such as for providing a user interface to display information about revenue transactions, for displaying map displays, and/or the like. Data provided by an application server may be formatted as one or more web pages (comprising HTML, JavaScript, etc., for example) and/or may be forwarded to a user computer 1105 via a web server (as described above, for example). Similarly, a web server might receive web page requests and/or input data from a user computer 1105 and/or forward the web page requests and/or input data to an application server. In some cases a web server may be integrated with an application server.

In accordance with further embodiments, one or more servers 1115 can function as a file server and/or can include one or more of the files (e.g., application code, data files, etc.) necessary to implement various disclosed methods, incorporated by an application running on a user computer 1105 and/or another server 1115. Alternatively, as those skilled in the art will appreciate, a file server can include all necessary files, allowing such an application to be invoked remotely by a user computer 1105 and/or server 1115.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1120. The location of the database(s) 1120 is discretionary: merely by way of example, a database 1120a might reside on a storage medium local to (and/or resident in) a server 1115a (and/or a user computer 1105). Alternatively, a database 1120b can be remote from any or all of the computers 1105, 1115, so long as it can be in communication (e.g., via the network 1110) with one or more of these. In a particular set of embodiments, a database 1120 can reside in a storage-area network ("SAN") familiar to those skilled in the art. (Likewise, any necessary files for performing the functions attributed to the computers 1105, 1115 can be stored locally on the respective computer and/or remotely, as appropriate.) In one set of embodiments, the database 1135 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A computer system, comprising:
one or more processors; and
memory in communication with the one or more processors, the memory having encoded thereon a set of instructions executable by the one or more processors to cause the computer system to at least:
   access revenue data, stored in a database, about a plurality of revenue transactions;
   provide a user interface for a user to interact with a data presentation system in communication with the database;
   receive, via the user interface, selection of a product line for analysis;
   identify a set of revenue transactions corresponding to the selected product line in response to receiving the selection of the product line, each of the revenue transactions in the set of revenue transactions having an associated customer, wherein identifying the set of revenue transactions includes searching the database for the set of revenue transactions;
   identify a set of customers associated with the set of revenue transactions;
   identify a plurality of product lines that have an affinity to the selected product line, the plurality of product lines including revenue attributable to the set of customers;
   assign a rank to each of the product lines in the plurality of product lines, the rank being assigned according to an affinity between each product line in the plurality of product lines and the selected product line;
   analyze each of the customers in the set of customers to identify an amount of revenue for the selected product line and one or more product lines of the plurality of product lines attributable to each customer in the set;
   receive a selection of a revenue characteristic of interest;
   segment the set of customers into a plurality of subsets of customers, according to the selected revenue characteristic of interest;
   provide for display, in the user interface, the selected product line and the one or more product lines, the one or more product lines being provided for display relative to the selected product line according to the assigned rank of each of the one or more product lines; and
   provide for display, in the user interface, information about revenue attributable to at least one of the subsets of customers, the information including revenue for the selected product line and the one or more product lines.

2. A method, comprising:
accessing revenue data, stored in a database, about a plurality of revenue transactions;
providing, at a computer system, a user interface for a user to interact with a data presentation system in communication with the database;
receiving, via the user interface, selection of a product line for analysis;
identifying, at the computer system, a set of revenue transactions corresponding to the selected product line in response to receiving the selection of the product line, each of the revenue transactions in the set of revenue transactions having an associated customer, wherein identifying the set of revenue transactions includes searching the database for the set of revenue transactions;
identifying, at the computer system, a set of customers associated with the set of revenue transactions;
identifying, at the computer system, a plurality of product lines that have an affinity to the selected product line, the plurality of product lines including revenue attributable to the set of customers;
assigning, at the computer system, a rank to each of the product lines in the plurality of product lines, the rank being assigned according to an affinity between each product line in the plurality of product lines and the selected product line;
analyzing, at the computer system, each of the customers in the set of customers to identify an amount of revenue for the selected product line and one or more product lines of the plurality of product lines attributable to each customer in the set;
receiving, via the user interface, a selection of a revenue characteristic of interest;
segmenting, at the computer system, the set of customers into a plurality of subsets of customers, according to the selected customer characteristic of interest;
providing for display, in the user interface, the selected product line and the one or more product lines, the one or more product lines being provided for display relative to the selected product line according to the assigned rank of each of the one or more product lines; and
providing for display, in the user interface, revenue information about at least one of the subsets of customers, the revenue information including revenue for the selected product line and the one or more product lines.

3. A non-transitory computer-readable storage medium having encoded thereon a set of instructions executable by one or more computers to perform one or more operations, the set of instructions comprising:
   instructions for accessing revenue data, stored in a database, about a plurality of revenue transactions;
   instructions for providing a user interface for a user to interact with a data presentation system in communication with the database;
   instructions for receiving, via the user interface, selection of a product line for analysis;
   instructions for identifying a set of revenue transactions corresponding to the selected product line in response to receiving the selection of the product line, each of the revenue transactions in the set of revenue transactions having an associated customer, wherein identifying the set of revenue transactions includes searching the database for the set of revenue transactions;
   instructions for identifying a set of customers associated with the set of revenue transactions;
   instructions for identifying a plurality of product lines that have an affinity to the selected product line, the plurality of product lines including revenue attributable to the set of customers;
   instructions for assigning a rank to each of the product lines in the plurality of product lines, the rank being assigned according to an affinity between each product line in the plurality of product lines and the selected product line;
   instructions for analyzing each of the customers in the set of customers to identify an amount of revenue for the selected product line and one or more product lines of the plurality of product lines attributable to each customer in the set;
   instructions for receiving a selection of a revenue characteristic of interest;

instructions for segmenting the set of customers into a plurality of subsets of customers, according to the selected revenue characteristic of interest;

instructions for providing for display, in the user interface, the selected product line and the one or more product lines, the one or more product lines being provided for display relative to the selected product line according to the assigned rank of each of the one or more product lines; and instructions for providing for display, in the user interface, information about revenue attributable to at least one of the subsets of customers, the information including revenue for the selected product line and the one or more product lines.

4. The computer-readable storage medium of claim 3, wherein the instructions for displaying information about revenue to at least one of the subsets of customers comprise:

instructions for generating a dashboard display in the user interface; and instructions for displaying, in the dashboard display, a plurality of panels comprising information about revenue attributable to at least one of the subsets of customers, wherein at least one of the panels comprises a graphical display of the information.

5. The computer-readable storage medium of claim 3, wherein the information about revenue attributable to at least one of the subsets of customers comprises information selected from the group consisting of:

an amount of revenue attributable to the at least one of the subsets of customers over a period of time;

an amount of growth of revenue attributable to the at least one of the subsets of customers over the period of time;

an amount of products sold to the customers in the at least one of the subsets of customers over the period of time; and an amount of customers in the at least one of the subsets of customers.

6. The computer-readable storage medium of claim 5, wherein the period of time is a plurality of fiscal periods, and wherein the displayed information is organized by fiscal period.

7. The computer-readable storage medium of claim 3, wherein the revenue data comprises a first set of revenue data pertaining to revenue on sales of one or more products, and a second set of revenue data pertaining to services related to the one or more products.

8. The computer-readable storage medium of claim 3, wherein the revenue characteristic of interest is an amount of revenue earned on sales of the product line.

9. The computer-readable storage medium of claim 8, wherein:

the instructions for segmenting the set of customers into a plurality of subsets comprise:

instructions for assigning a rank to each of the customers in the set of customers, according to an amount of revenue earned on sales of the product line to each of the customers;

instructions for defining a segmentation scheme for the set of customers, wherein the segmentation scheme divides the set of customers into a specified number of subsets of customers according to the rank assigned to each customer; and the instructions for displaying information about revenue attributable to at least one of the subsets of customers comprise:

instructions for calculating an amount of revenue attributable to each of the subsets of customers; and instructions for displaying the amount of revenue attributable to each of the subsets of customers.

10. The computer-readable storage medium of claim 3, wherein the revenue characteristic of interest is a customer characteristic selected from the group consisting of: a customer size, an amount of revenue attributable to a customer, a customer industry segment, and a customer region.

11. The computer-readable storage medium of claim 3, wherein:

the revenue characteristic of interest is a first revenue characteristic of interest;

the set of instructions further comprises:

instructions for receiving a selection of a second revenue characteristic of interest; and instructions for segmenting at least one of the subsets of customers into a second plurality of subsets of customers, according to the selected second revenue characteristic of interest; and the instructions for displaying information about revenue attributable to at least one of the subsets of customers comprise instructions for displaying information about revenue attributable to at least one of the subsets of customers in the second plurality of subsets of customers.

12. The computer-readable storage medium of claim 3, wherein the product line is a first product line, and the revenue characteristic of interest is an amount of revenue earned on sales of one or more product lines other than the first product line.

13. The computer-readable storage medium of claim 12, wherein the instructions for displaying information about revenue attributable to at least one of the subsets of customers comprise:

instructions for displaying, in the user interface, information about at least some of the product lines in the plurality of product lines, based on the rank assigned to each of the product lines.

14. The computer-readable storage medium of claim 13, wherein the instructions for displaying information about at least some of the product lines comprise instructions for displaying a graphical depiction of an affinity between the first product line and one or more of the plurality of product lines.

15. The computer-readable storage medium of claim 3, wherein the plurality of product lines are ranked according to a criterion selected from the group consisting of an amount of revenue generated by each product line, an amount of products sold for each product line, and an amount of customers purchasing each product line.

16. The computer-readable storage medium of claim 3, wherein the selected product line is a plurality of selected product lines.

17. The computer-readable storage medium of claim 16, wherein the customer characteristic of interest is purchase of a competing product sold by a competitor, wherein the plurality of subsets of customers comprises a first subset of customers that have purchased the competing product and a second subset of customers that have not purchased the competing product.

18. The computer-readable storage medium of claim 17, wherein the instructions for displaying information about revenue attributable to at least one of the subsets of customers comprise instructions to display, for each of the plurality of selected product lines, information about revenue attributed to the first subset of customers and revenue attributed to by the second subset of customers.

19. The computer-readable storage medium of claim 3, wherein the instructions for displaying information about revenue attributable to at least one of the subsets of customers comprise instructions for displaying the information on a map display in the user interface.

\* \* \* \* \*

UNITED STATES PATENT AND TRADEMARK OFFICE
CERTIFICATE OF CORRECTION

PATENT NO. : 8,688,502 B2  Page 1 of 1
APPLICATION NO. : 12/711648
DATED : April 1, 2014
INVENTOR(S) : Hartley et al.

It is certified that error appears in the above-identified patent and that said Letters Patent is hereby corrected as shown below:

In the Specification

In column 7, line 8, delete "herein.)" and insert -- herein.). --, therefor.

In column 8, line 33, delete "operations.)" and insert -- operations.). --, therefor.

In column 16, line 14, delete "necessary.)" and insert -- necessary.). --, therefor.

Signed and Sealed this
Twenty-sixth Day of August, 2014

Michelle K. Lee
*Deputy Director of the United States Patent and Trademark Office*